United States Patent
Haga et al.

(10) Patent No.: US 10,974,669 B2
(45) Date of Patent: Apr. 13, 2021

(54) GATEWAY DEVICE, VEHICLE NETWORK SYSTEM, AND TRANSFER METHOD

(71) Applicant: PANASONIC INTELLECTUAL PROPERTY CORPORATION OF AMERICA, Torrance, CA (US)

(72) Inventors: Tomoyuki Haga, Nara (JP); Toshihisa Nakano, Osaka (JP); Jun Anzai, Kanagawa (JP); Hideki Matsushima, Osaka (JP); Yoshihiro Ujiie, Osaka (JP); Yuji Unagami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/664,192

(22) Filed: Oct. 25, 2019

(65) Prior Publication Data

US 2020/0055470 A1 Feb. 20, 2020

Related U.S. Application Data

(63) Continuation of application No. 15/881,826, filed on Jan. 29, 2018, now Pat. No. 10,525,911, which is a
(Continued)

(30) Foreign Application Priority Data

Jun. 16, 2016 (JP) .............................. JP2016-119773

(51) Int. Cl.
*H04L 9/32* (2006.01)
*B60R 16/023* (2006.01)
(Continued)

(52) U.S. Cl.
CPC ........ *B60R 16/0231* (2013.01); *H04L 9/3242* (2013.01); *H04L 12/40* (2013.01);
(Continued)

(58) Field of Classification Search
CPC ............... B60R 16/0231; H04L 9/3242; H04L 12/40006; H04L 12/4625; H04L 12/40169;
(Continued)

(56) References Cited

U.S. PATENT DOCUMENTS 8,130,768 B1 * 3/2012 Ahrens .................. H04L 45/00
370/401
2014/0310530 A1 10/2014 Oguma et al.
(Continued)

FOREIGN PATENT DOCUMENTS

CN 104717201 A 6/2015
JP 2005-343430 A 12/2005
(Continued)

OTHER PUBLICATIONS

International Search Report of PCT application No. PCT/JP2016/003145 dated Oct. 11, 2016.
(Continued)

*Primary Examiner* — Thai Nguyen
(74) *Attorney, Agent, or Firm* — Greenblum & Bernstein, P.L.C.

(57) ABSTRACT

A gateway connected to a bus, a bus, and the like used by a plurality of electronic control units for communication includes a frame communication unit that receives a frame, a transfer control unit that removes verification information used to verify a frame from the content of the frame received by the frame communication unit and transfers the frame to a destination bus or that adds verification information to the content of the frame and transfers the frame to the destination bus, and the like.

16 Claims, 16 Drawing Sheets

Related U.S. Application Data continuation of application No. PCT/JP2016/003145, filed on Jun. 30, 2016.

(60) Provisional application No. 62/212,104, filed on Aug. 31, 2015.

(51) Int. Cl.
  *H04L 12/40* (2006.01)
  *H04L 12/46* (2006.01)
  *H04L 12/66* (2006.01)

(52) U.S. Cl.
  CPC .. *H04L 12/40006* (2013.01); *H04L 12/40169* (2013.01); *H04L 12/4625* (2013.01); *H04L 12/66* (2013.01); H04L 2012/40215 (2013.01); H04L 2012/40273 (2013.01); H04L 2209/84 (2013.01)

(58) Field of Classification Search
  CPC .............. H04L 12/40; H04L 12/66; H04L 2012/40273; H04L 2209/84; H04L 2012/40215

See application file for complete search history.

(56) References Cited

U.S. PATENT DOCUMENTS

| | | |
|---|---|---|
| 2015/0020152 A1 | 1/2015 | Litichever et al. |
| 2015/0089236 A1* | 3/2015 | Han .................. H04L 9/3242 713/181 |
| 2015/0095997 A1 | 4/2015 | Mabuchi |
| 2015/0172298 A1 | 6/2015 | Otsuka |
| 2016/0099939 A1 | 4/2016 | Jung et al. |

FOREIGN PATENT DOCUMENTS

| | | |
|---|---|---|
| JP | 2013-098719 A | 5/2013 |
| WO | 2013/175633 A1 | 11/2013 |
| WO | 2013/179392 A1 | 12/2013 |

OTHER PUBLICATIONS

Extended European Search Report dated May 16, 2018 for related European Patent Application No. 16841029.8.

English Translation of Chinese Search Report dated May 27, 2020 for the related Chinese Patent Application No. 201680016304.4.

* cited by examiner

| BUS ID | MAC-ENABLED/<br>NON-MAC-ENABLED |
|---|---|
| 10 | MAC-ENABLED |
| 20 | MAC-ENABLED |
| 30 | MAC-ENABLED |
| 40 | NON-MAC-ENABLED |
| 50 | NON-MAC-ENABLED |
| 60 | NON-MAC-ENABLED |
| 70 | NON-MAC-ENABLED |

| SOURCE BUS ID | DESTINATION BUS ID | MESSAGE ID |
|---|---|---|
| 10 | 20,30,70 | ALL |
| 10 | 40,50,60 | 0x001,0x002,0x003 |
| 20 | 10,30,70 | ALL |
| 20 | 40,50,60 | 0x001,0x002,0x003 |
| 30 | 10,20,40,70 | ALL |
| 30 | 50,60 | - |
| 40 | 10,20,30,40,50 | ALL |
| 50 | - | - |
| 60 | 40,50 | ALL |
| 70 | 10,20,30,40,50,60 | 0x800,0x900 |

FIG. 8

| MESSAGE ID | KEY VALUE |
|---|---|
| 0x001 | 0x239....A4 |
| 0x002 | 0xC67....26 |
| 0x003 | 0x429....1C |
| 0x100 | 0xB2C....34 |
| 0x120 | 0x976....1D |
| 0x800 | 0xC2D....6A |
| 0x900 | 0x3A9....AC |
| 0x912 | 0x8D7....DA |

| MESSAGE ID | COUNTER VALUE |
|---|---|
| 0x001 | 0x023....C4 |
| 0x002 | 0x764....26 |
| 0x003 | 0x8C1....1C |
| 0x100 | 0xB7A....34 |
| 0x120 | 0x901....1D |
| 0x800 | 0x001....DA |
| 0x900 | 0x245....CA |
| 0x912 | 0x105....BA |

| DESTINATION BUS ID | MAC REMOVAL CONDITION |
|---|---|
| 10 | BUS OCCUPATION RATE 50% OR MORE |
| 20 | BUS OCCUPATION RATE 40% OR MORE |
| 30 | BUS OCCUPATION RATE 30% OR MORE |

| SOF | ID FIELD | RTR | IDE | r | DLC | DATA FIELD | CRC | DEL | ACK | DEL | EOF |
|---|---|---|---|---|---|---|---|---|---|---|---|
| 1 | 11 | 1 | 1 | 1 | 4 | 0 TO 64 | 15 | 1 | 1 | 1 | 7 |

FIG. 15B

| SOF | ID FIELD | SRR | IDE | ENHANCED ID | RTR | r1 | r0 | DLC | DATA FIELD | CRC |
|---|---|---|---|---|---|---|---|---|---|---|
| 1 | 11 | 1 | 1 | 18 | 1 | 1 | 1 | 4 | 0 TO 512 | 17/21 |

FIG. 16

| BUS ID | CORRESPONDING FORMAT |
|---|---|
| 10 | ENHANCED FORMAT |
| 20 | ENHANCED FORMAT |
| 30 | ENHANCED FORMAT |
| 40 | ENHANCED FORMAT |
| 50 | STANDARD FORMAT |
| 60 | STANDARD FORMAT |
| 70 | STANDARD FORMAT |

9073

GATEWAY DEVICE, VEHICLE NETWORK SYSTEM, AND TRANSFER METHOD

CROSS REFERENCE TO RELATED APPLICATIONS

This is a continuation application of U.S. patent application Ser. No. 15/881,826, filed Jan. 29, 2018, which is a Continuation Application of International Application No. PCT/JP2016/003145, filed Jun. 30, 2016, which claims the benefit of U.S. Provisional Application No. 62/212,104, filed Aug. 31, 2015, and Japanese Patent Application No. 2016-119773, filed Jun. 16, 2016. The entire disclosure of each of the above-identified applications, including the specification, drawings, and claims, is incorporated herein by reference in its entirety.

BACKGROUND

1. Technical Field

The present invention relates to a gateway device that transfers frames in a network in which electronic control units (ECUs) communicate with one another.

2. Description of the Related Art

During these years, a large number of devices called ECUs are provided in a system inside an automobile. A network connecting these ECUs with one another is called a vehicle network. A lot of standards exist for vehicle networks. A standard called a controller area network (CAN) specified in International Organization for Standardization (ISO) 11898-1 is one of major vehicle networks.

In a CAN, a communication path is configured by two buses, and ECUs connected to the buses are called nodes. The nodes connected to the buses communicate messages called frames. A transmission node, which transmits a frame, applies voltage to the two buses to generate a potential difference between the buses and transmit a value of "1" called a recessive and a value of "0" called a dominant. If a plurality of transmission nodes transmit a recessive and a dominant at exactly the same timing, the dominant takes priority in transmission. If a format of a received frame is abnormal, a reception node transmits a frame called an error frame. An error frame refers to successive transmission of 6 bits of dominants for notifying a transmission node and other reception nodes of an abnormality in a frame.

In the CAN, there are no identifiers identifying destinations and sources. A transmission node transmits each frame with an identifier (ID; an identifier of the frame) called a message ID added (that is, transmits a signal to the buses), and each reception node receives only frames having predetermined IDs (that is, reads a signal from the buses). In addition, a carrier-sense multiple access with collision avoidance (CSMA/CA) method is employed, and when a plurality of nodes simultaneously perform transmission, mediation is carried out using message IDs. That is, a frame whose message ID is smaller takes priority in transmission.

A gateway (GW) device, which is a kind of ECU connected to a plurality of buses in a vehicle network, has a function of transferring frames between buses.

Because the CAN does not have a security function that assumes a case in which an unauthorized frame is transmitted, a vehicle body might be illicitly controlled when an unauthorized node is connected to buses in the vehicle network and illicitly transmits a frame. In order to prevent transmission of such an unauthorized frame and resultant control, a technique for identifying a frame transmitted by an authorized ECU by adding a message authentication code (MAC) to a data field in a CAN and transmitting a frame is known (refer to Japanese Unexamined Patent Application Publication No. 2013-98719).

SUMMARY

The above conventional technique requires further improvements.

In one general aspect, the techniques disclosed here feature a gateway device connected to one or more buses used by a plurality of electronic control units for communication. The gateway device includes a reception unit that receives a frame and a transfer unit that removes verification information used to verify the frame from content of the frame received by the reception unit and transfers the frame to a destination bus, which is one of the one or more buses or that adds verification information to the content of the frame and transfers the frame to the destination bus.

According to the above aspect, further improvements can be achieved.

It should be noted that these general or specific aspects may be implemented as an apparatus, a system, an integrated circuit, a computer program, a computer-readable recording medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of bus information held by the gateway according to the first embodiment;

FIG. 7 is a diagram illustrating an example of transfer rule information held by the gateway according to the first embodiment;

FIG. 8 is a diagram illustrating an example of a MAC key list held by the gateway according to the first embodiment;

FIG. 9 is a diagram illustrating an example of a counter list held by the gateway according to the first embodiment;

FIG. 12 is a diagram illustrating an example of a MAC removal condition list held by a gateway according to a second embodiment;

FIG. 15A is a diagram illustrating a standard format of data frames;

FIG. 15B is a diagram illustrating an enhanced format of data frames;

FIG. 16 is a diagram illustrating an example of bus information held by a gateway according to a third embodiment;

DETAILED DESCRIPTION

Figure 1:
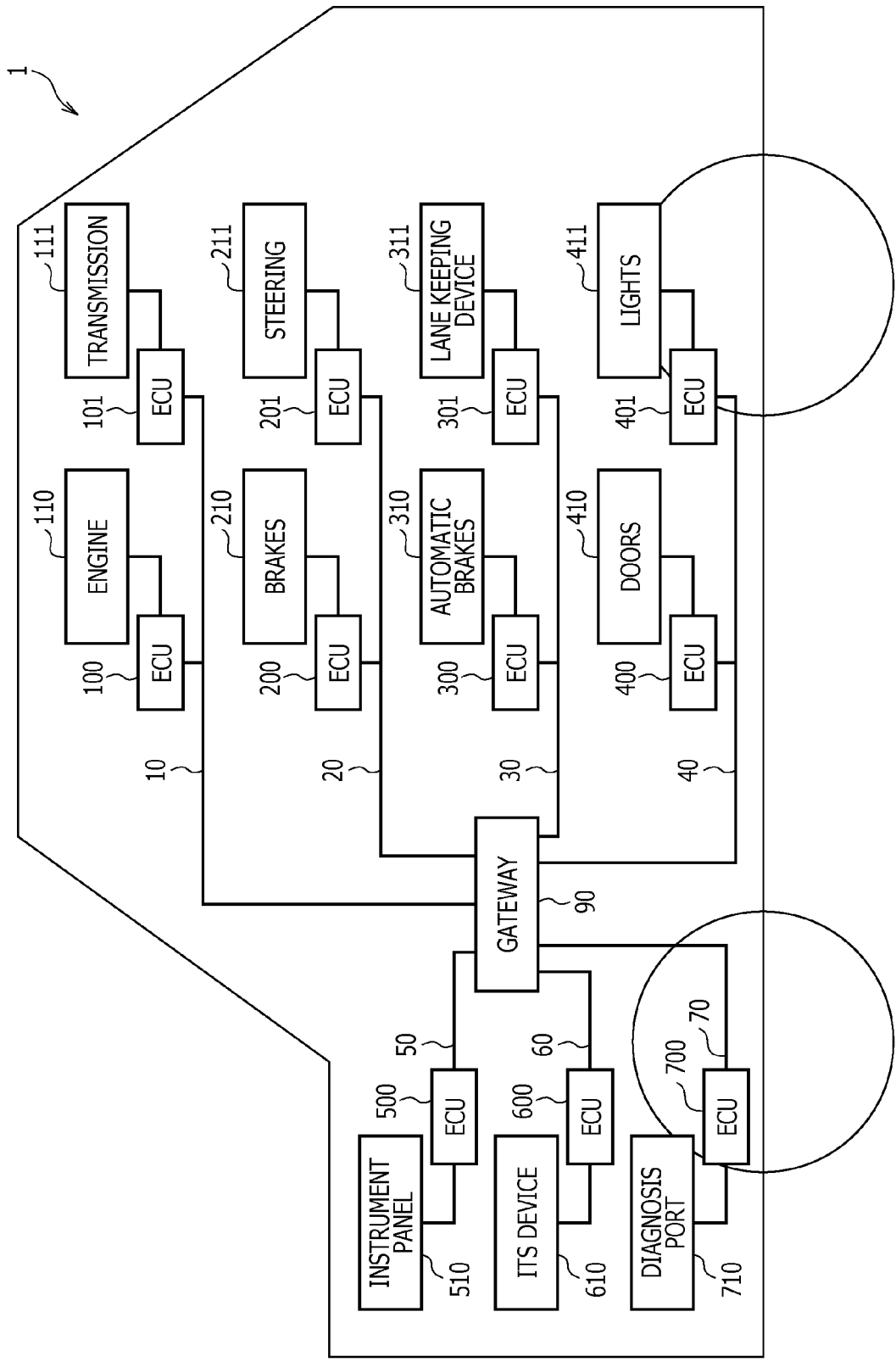
FIG. 1 is a diagram illustrating the overall configuration of a vehicle network system according to a first embodiment.

Underlying Basis Forming Basis of Present Disclosure

Frames communicated between various ECUs mounted on a vehicle greatly vary from ones important in terms of vehicle security to ones not so important. It is therefore inefficient to construct a vehicle network system such that all ECUs mounted on a vehicle have a message authentication function (verification function) according to MACs as frame verification information.

On the basis of the above examination, the present inventor has conceived aspects of the present disclosure.

A gateway device according to an aspect of the present disclosure is a gateway device connected to one or more buses used by a plurality of electronic control units for communication. The gateway device includes a receiver that receives a frame and a transferor that removes verification information used to verify the frame from content of the frame received by the receiver and transfers the frame to a destination bus, which is one of the one or more buses or that adds verification information to the content of the frame and transfers the frame to the destination bus. As a result, since verification information is added or removed before transfer, efficient transfer of a frame can be achieved in a network system including an ECU that does not have a function of verifying verification information.

In addition, if a first frame including verification information received by the receiver satisfies a certain removal condition for removing the verification information, the transferor may perform the transfer by generating a second frame including information based on the content of the first frame other than the verification information and transmitting the second frame to the destination bus. As a result, since a frame is transferred after verification information is removed under a certain condition, the amount of traffic of a destination bus when verification information is removed and a frame is transferred can be suppressed. In addition, when verification information is removed and a frame is transferred, an ECU connected to the destination bus need not process verification information. This can lead, for example, to achievement of efficient ECU arrangement in a vehicle network system.

In addition, the plurality of electronic control units may perform communication through the one or more buses in accordance with a controller area network protocol. The verification information may be a message authentication code arranged in a data field of a frame. If the certain removal condition is satisfied, the transferor may transmit, to the destination bus, a second frame that includes content of the data field of the first frame other than the message authentication code but that does not include a message authentication code. As a result, the security of a frame (message) can be enhanced in a vehicle network system using a message authentication code. In addition, by setting a certain removal condition such that the certain removal condition is satisfied when an ECU to which a frame is to be transferred does not require a message authentication code, unnecessary bus occupation time can be reduced.

In addition, the gateway device may be connected to a plurality of buses. The gateway device may include a transfer rule holding unit that holds transfer rule information indicating a criterion for selecting, from the plurality of buses, the destination bus to which the frame received by the receiver is to be transferred and bus information indicating, for each bus, whether the bus is a verification-enabled bus to which an electronic control unit having a function of verifying a frame on the basis of the verification information is connected or a non-verification-enabled bus to which an electronic control unit having the verification function is not connected. When transferring the frame, the transferor may select the destination bus on the basis of the transfer rule information and then, if the destination bus is a non-verification-enabled bus, determine that the certain removal condition has been satisfied and transfer the frame. As a result, when an ECU having the verification function relating to verification information is not connected to a destination bus to which a frame is to be transferred, a frame including verification information that is not effectively used is not transmitted to the destination bus.

In addition, the bus information may include message identifier information for distinguishing a verification message identifier, which is an identifier of a frame to be verified by an electronic control unit having the verification function connected to a verification-enabled bus, and a non-verification message identifier, which is an identifier of a frame that is not to be verified. If the destination bus is a verification-enabled bus and an identifier of the frame received by the receiver is a non-verification message identifier, the transferor may determine that the certain removal condition has been satisfied and transfer the frame. As a result, when an ECU having a function of verifying a frame having a certain identifier (message ID) on the basis of verification information is not connected to a destination bus to which a frame having the identifier is to be transferred, for example, a frame including verification information that is not effectively used is not transmitted to the destination bus.

In addition, if a bus occupation rate of the destination bus is higher than a certain value, the transferor may determine that the certain removal condition has been satisfied and transfer the frame. As a result, when the amount of traffic of a destination bus exceeds the certain value, for example, suppression of a bus occupation rate can take priority over securement of execution of verification of a frame performed by an ECU connected to the destination bus.

In addition, the transferor may include, in a frame to be transmitted to the destination bus, information indicating whether the frame includes verification information. As a result, even if an ECU connected to a destination bus does not measure a bus occupation rate, for example, whether a received frame includes verification information can be easily checked.

In addition, the gateway device may hold information indicating, for each electronic control unit connected to the one or more buses, whether the electronic control unit has a function of verifying a frame on the basis of the verification information. If an electronic control unit that is connected to the destination bus, to which the frame received by the receiver is to be transferred, and that performs a process according to the frame does not have the verification function, the transferor may determine that the certain removal condition has been satisfied and transfer the frame. As a result, when an ECU having a verification function corresponding to a frame is not connected to a destination bus to which the frame is to be transferred, a frame including verification information that is not effectively used is not transmitted to the destination bus.

In addition, the gateway device may hold message identifier information for distinguishing a verification message identifier, which is an identifier of a frame to be verified by an electronic control unit having a function of verifying a frame on the basis of the verification information connected to the one or more buses, and a non-verification message identifier, which is an identifier of a frame that is not to be verified. If an identifier of the frame received by the receiver is a non-verification message identifier, the transferor may determine that the certain removal condition has been satisfied and transfer the frame. As a result, when a frame to be transferred having a certain identifier (message ID) is not a target of verification performed by an ECU, for example, a frame including verification information that is not effectively used is not transmitted to a destination bus. In addition, whether to include verification information (e.g., a MAC) can be determined for each message ID, and whether to include a MAC can be changed even for frames (messages) to be transferred to the same ECU in accordance with the importance of the frames.

In addition, if it is determined on the basis of verification based on the verification information of the frame received by the receiver that the frame is unauthorized, the transferor need not transfer the frame. As a result, an unauthorized frame is not transferred, and a processing load of a destination ECU for handling an unauthorized frame is reduced.

In addition, the gateway device may be connected to a plurality of buses. The gateway device may include a transfer rule holding unit that holds transfer rule information indicating a criterion for selecting, from the plurality of buses, the destination bus to which the frame received by the receiver is to be transferred and bus information in which each bus and a frame format are associated with each other. When transferring the frame, the transferor may select the destination bus on the basis of the transfer rule information and then, if the destination bus is associated with a certain frame format in the bus information, determine that the certain removal condition has been satisfied and transfer the frame. This is effective, for example, in a system configuration in which an ECU having a verification function based on verification information regarding a frame is not connected to a bus having a certain frame format. It can be effective to determine, as the certain frame format, a frame format whose frame length is relatively small, for example, whose bus occupation rate is likely to increase significantly due to addition of verification information. It is to be noted that when frame formats corresponding to a source bus and a destination bus are different from each other, the gateway device may perform frame format conversion before transfer.

In addition, the gateway device may be connected to a plurality of buses. The gateway device may include a transfer rule holding unit that holds transfer rule information indicating a criterion for selecting, from the plurality of buses, the destination bus to which the frame received by the receiver is to be transferred and bus information in which each bus and a type of communication protocol used for communication performed by the bus are associated with each other. When transferring the frame, the transferor may select the destination bus on the basis of the transfer rule information and then, if the destination bus is associated with a certain communication protocol in the bus information, determine that the certain removal condition has been satisfied and transfer the frame. As a result, a frame can be efficiently transferred for a system in which ECUs are arranged such that verification based on verification information is not performed in a bus used to communicate using a certain communication protocol.

In addition, if the first frame including verification information received by the receiver does not satisfy the certain removal condition for removing the verification information, the transferor may generate a second frame including the information based on the content of the first frame other than the verification information and verification information generated using a key shared with an electronic control unit connected to the destination bus and transmit the second frame to the destination bus. As a result, the security of a frame can be enhanced.

In addition, if a frame that has been received by the receiver and that does not include verification information satisfies a certain addition condition for adding verification information, the transferor may perform the transfer by generating a frame including information based on content of the frame and verification information and transmitting the generated frame to the destination bus. As a result, even if a frame does not include verification information in a bus in which verification information is not used, for example, verification information is added to the frame and the frame is transferred. Security, therefore, can be enhanced for the frame, for example, through verification in the destination bus based on the verification information.

In addition, if the content of the frame received the receiver is encrypted, the transferor may remove, after decrypting the frame, verification information from the content of the decrypted frame or add verification information to the content of the decrypted frame and transfer the frame. As a result, since decryption is performed before a frame is transferred, a destination ECU can appropriately process the received frame, for example, even if the destination ECU does not have a decryption function.

In addition, the transferor may perform the transfer by generating a second frame that includes information based on the content of the first frame including verification information received by the receiver other than the verification information but that does not include verification information and transmitting the second frame to the destination bus and transmits a third frame that includes the information based on the content of the first frame other than the verification information, verification information, and a frame identifier different from a frame identifier of the second frame. As a result, even if an ECU having the verification function for verifying a frame on the basis of verification information and an ECU that does not have the verification function are connected to a destination bus, the ECU that does not have the verification function can receive and process the second frame, and the ECU having the verification function can receive, verify, and process the third frame. In this case, a processing load of the ECU that does not have the verification function corresponding to verification information is reduced.

In addition, a vehicle network system according to an aspect of the present disclosure is a vehicle network system including a plurality of electronic control units that communicate with one another through one or more buses and a gateway device connected to the one or more buses. The gateway device includes a receiver that receives a frame and a transferor that removes verification information used to verify the frame from content of the frame received by the receiver and transfers the frame to a destination bus, which is one of the one or more buses or that adds verification information to the content of the frame and transfers the frame to the destination bus. As a result, since verification information is added or removed before a frame received from some communication path (e.g., one bus) is transferred to a destination bus, a frame can be efficiently transferred in a vehicle network system including an ECU that does not have a function of verifying verification information.

In addition, the vehicle network system may further include a plurality of buses to which the plurality of electronic control units are connected. The gateway device may be connected to the plurality of buses. The gateway device may include a transfer rule holding unit that holds transfer rule information indicating a criterion for selecting, from the plurality of buses, the destination bus to which the frame received by the receiver is to be transferred and. When transferring the frame received by the receiver, the transferor may select the destination bus on the basis of the transfer rule information and then, on the basis of whether the destination bus is a bus to which an electronic control unit having a function of verifying a frame on the basis of verification information, remove or add verification information from or to the frame and transfer the frame. As a result, when an ECU having the verification function relating to the verification information is not connected to a destination bus to which a frame is to be transferred, a frame including verification information that is not effectively used is not transmitted to the destination bus.

In addition, a transfer method according to an aspect of the present disclosure is a transfer method used in a vehicle network system including a plurality of electronic control units that communicate with one another through one or more buses. The transfer method includes receiving a frame and transferring, after the frame is received in the receiving, the frame to a destination bus, which is one of the one or more buses, while removing or adding verification information used to verify the frame from or to the frame. As a result, since verification information is added or removed before a frame is transferred to a destination bus, the frame can be efficiently transferred in a vehicle network system including an ECU that does not have a function of verifying verification information.

It should be noted that these general or specific aspects may be implemented as a system, a method, an integrated circuit, a computer program, a computer-readable recording medium such as a CD-ROM, or any selective combination thereof.

Vehicle network systems including a gateway according to embodiments will be described hereinafter with reference to the drawings. The embodiments described hereinafter are specific examples of the present disclosure. Values, components, arrangement and connection modes of the components, steps (procedure), the order of the steps, and the like, therefore, are examples and do not limit the present disclosure. Among the components described in the following embodiments, ones not described in independent claims are components that can be arbitrarily added. The drawings are schematic diagrams and not necessarily strict.

First Embodiment

A vehicle network system 1 in which a plurality of ECUs including a gateway device communicate with one another through buses will be described hereinafter as an embodiment of the present disclosure with reference to the drawings. The gateway device according to the present embodiment employs a certain transfer method for transferring a received frame (also referred to as a message) to a destination bus. When a frame is transferred in this transfer method, a MAC, which is verification information for verifying a frame, is removed under a certain condition or added under a certain condition. When a frame is transferred to a bus to which an ECU having a verification function for verifying a MAC is not connected (a bus to which an ECU that does not have the verification function is connected), for example, the gateway device performs transfer by removing a MAC from a received frame and transmitting the frame to the destination bus. As a result, the amount of traffic of the destination bus can be reduced, and the ECU connected to the bus need not perform a process relating to the MAC.

1.1 Overall Configuration of Vehicle Network System 1

FIG. 1 is a diagram illustrating the overall configuration of the vehicle network system 1 according to a first embodiment. The vehicle network system 1 is an example of a network communication system that performs communication in accordance with a CAN protocol and is a network communication system in an automobile on which various devices such as control devices and sensors are mounted. The vehicle network system 1 is configured by including nodes connected by buses 10 to 70 in a CAN, such as a plurality of ECUs (ECUs 100, 101, 200, 201, 300, 301, 400, 401, 500, 600, and 700) and a gateway 90. Although not illustrated in FIG. 1, the vehicle network system 1 can further include other ECUs. Each ECU is, for example, a device including digital circuits such as a processor (microprocessor) and a memory, an analog circuit, and a communication circuit. The memory is a read-only memory (ROM), a random-access memory (RAM), or the like and can store control programs (computer programs) to be executed by the processor. When the processor operates in accordance with the control programs (computer programs), the ECUs achieve various functions. It is to be noted that the computer programs are each configured by combining a plurality of command codes indicating instructions to the processor in order to achieve certain functions.

Driving ECUs relating to "running" (driving) of a vehicle, such as control of a motor, fuel, and batteries, including the ECU 100 and the ECU 101 connected to an engine 110 and a transmission 111, respectively, are connected to the bus 10.

Chassis ECUs relating to control of the behavior of the vehicle, such as "turn" and "stop", including the ECU 200 and the ECU 201 connected to brakes 210 and steering 211, respectively, are connected to the bus 20.

Safety/comfort function ECUs relating to a vehicle distance keeping function, a collision prevention function, airbags, and the like including the ECU 300 and the ECU 301 connected to automatic brakes 310 and a lane keeping device 311, respectively, are connected to the bus 30.

Body ECUs relating to control of vehicle equipment, such as air conditioners and blinkers, including the ECU 400 and the ECU 401 connected to doors 410 and lights 411, respectively, are connected to the bus 40.

Infotainment ECUs relating to car navigation, audio, and the like including the ECU 500 (head unit) connected to an instrument panel 510 are connected to the bus 50.

Intelligent transportation system (ITS) ECUs that support intelligent transport systems, such as an electronic toll collection (ETC) system, including the ECU 600 connected to an ITS device 610 are connected to the bus 60.

The ECU 700 connected to a diagnosis port 710, which is an interface for communicating with an external fault diagnosis tool or the like such as on-board diagnostics 2 (OBD-II), is connected to the bus 70. It is to be noted that the ECU 700 may be removed and the diagnosis port 710 may be connected to the bus 70. The above-mentioned devices connected to the ECUs connected to these buses are examples, and, for example, may be replaced by another device or other devices or may be omitted.

The ECUs (the ECUs 100, 200, etc.) obtain states of the devices (the engine 110, the brakes 210, etc.) connected thereto and regularly transmit frames indicating the states or the like to a network (i.e., the CAN buses).

The ECUs 100 and 101 connected to the bus 10, the ECUs 200 and 201 connected to the bus 20, and the ECUs 300 and 301 connected to the bus 30 are MAC-enabled ECUs and have a function of processing a MAC (a function of generating a MAC and a function of verifying a MAC). In addition, the ECUs 400 and 401 connected to the bus 40, the ECU 500 connected to the bus 50, the ECU 600 connected to the bus 60, and the ECU 700 connected to the bus 70 are non-MAC-enabled ECUs and do not have the function of processing a MAC (the function of generating a MAC and the function of verifying a MAC).

The gateway 90 is a gateway device that connects a plurality of different communication paths together and that transfers data between the communication paths. The gateway 90 is connected to the bus 10, the bus 20, the bus 30, the bus 40, the bus 50, the bus 60, and the bus 70. That is, the gateway 90 is a kind of ECU having a function of transferring a frame (data frame) received from a bus to another bus (i.e., a destination bus selected in accordance with a condition) under a certain condition. The gateway 90, for example, transfers a frame including a MAC received from a bus. The transfer specifically refers to generation of a transmission frame that includes information based on the content of the received frame including a MAC and that includes a MAC (e.g., the same MAC as the received MAC or a newly generated MAC) and transmission of the transmission frame to a destination bus. In addition, the gateway 90 removes a MAC from a frame including the MAC received from a bus under a certain condition and transfers the frame. The removal of a MAC from a frame and the transfer of the frame specifically refer to generation of a transmission frame including information based on a part, other than a MAC, of the content of a received frame including the MAC and transmission of the transmission frame to a destination bus without including the MAC in the transmission frame. In addition, the gateway 90 adds a MAC to a frame that does not including a MAC received from a bus and transfers the frame under a certain condition. The addition of a MAC to a frame and the transfer of the frame specifically refer to generation of a transmission frame including information based on the content of a received frame and transmission of the transmission frame while including a MAC in the transmission frame. The gateway 90 can switch whether to transfer a received frame for each bus connected thereto. It is to be noted that the vehicle network system 1 can include buses that are not illustrated in FIG. 1 and one or more gateway devices other than the gateway 90.

In the vehicle network system 1, the ECUs communicate frames in accordance with the CAN protocol. Frames in the CAN protocol include a data frame, a remote frame, an overload frame, and an error frame. The data frame will be mainly focused upon and described hereinafter.

1.2 Data Frame Format

The data frame, which is one of the frames used in a network according to the CAN protocol, will be described hereinafter.

Figure 2:
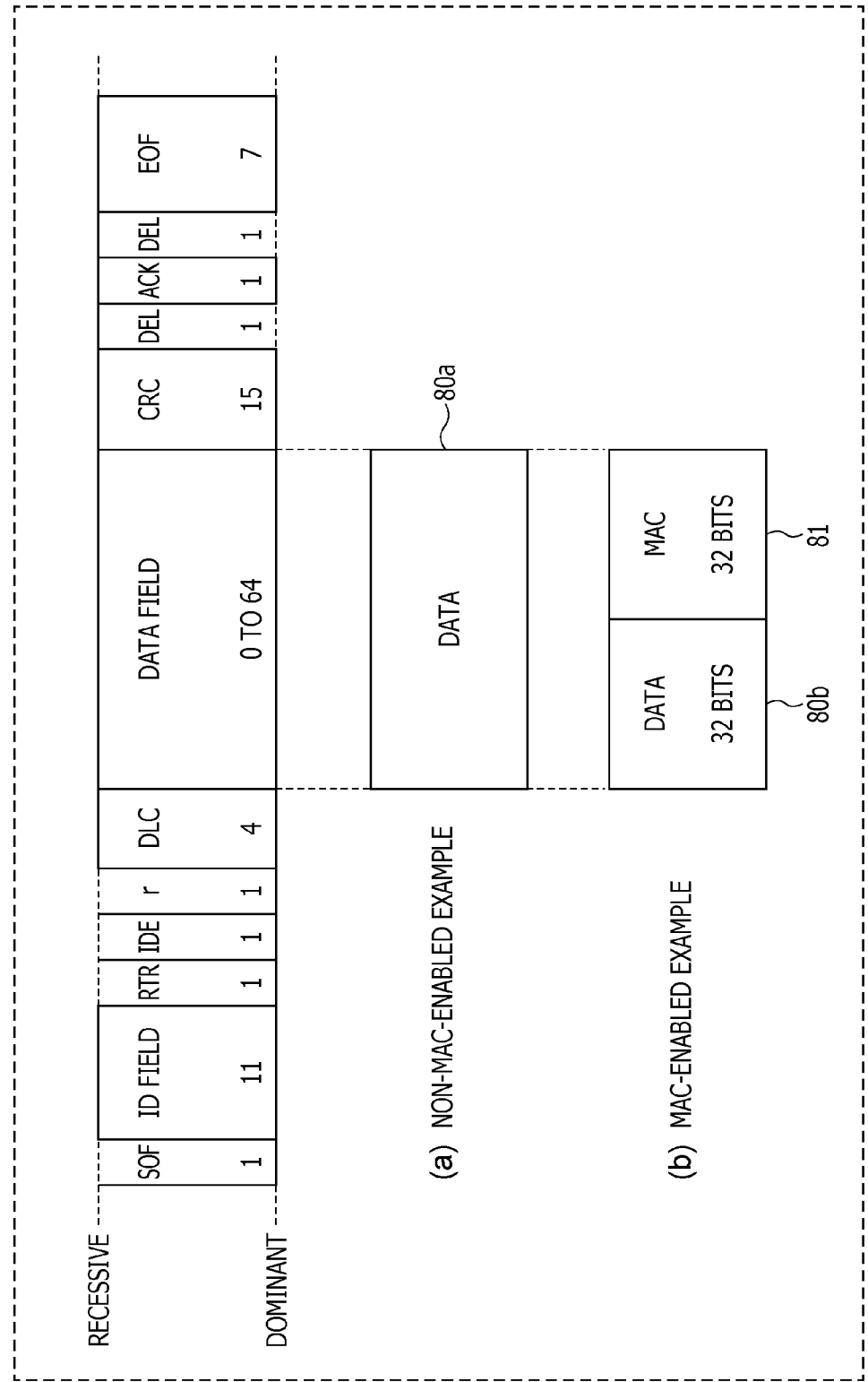
FIG. 2 is a diagram illustrating a format of a data frame specified in a CAN protocol.

FIG. 2 is a diagram illustrating a format of the data frame specified in the CAN protocol. The figure illustrates a data frame in a standard format (standard ID format) specified in the CAN protocol. The data frame includes fields of an start of frame (SOF), an ID field, an remote transmission request (RTR), an identifier extension (IDE), a reserved bit "r", a data length code (DLC), a data field, a cyclic redundancy check (CRC) sequence, a CRC delimiter "DEL", an acknowledgement (ACK) slot, an ACK delimiter "DEL", and an end of frame (EOF).

The SOF is configured by a 1-bit dominant. When the buses are idle, the data frame is recessive. By making the data frame dominant using the SOF, start of transmission of the frame is notified.

The ID field is a field in which an ID (i.e., a message ID that is an identifier of a frame), which is a value configured by 11 bits and indicating a type of data, is stored. The ID field is designed such that a frame having a smaller ID value has higher priority, so that if a plurality of nodes simultaneously start transmission, the communication can be mediated using the ID field.

The RTR is a value for distinguishing a data frame and a remote frame. In the data frame, the RTR is configured by a dominant 1 bit.

The IDE and the "r" are both configured by a dominant 1 bit.

The DLC is configured by 4 bits and is a value indicating the length of the data field. It is to be noted that the IDE, the "r", and the DLC will be collectively referred to as a control field.

The data field is a value configured by up to 64 bits and indicating the content of data to be transmitted. The length can be adjusted in steps of 8 bits. Specifications of the data to be transmitted are not specified in the CAN protocol but determined by the vehicle network system 1. The specifications, therefore, depend upon a vehicle model, a manufacturer (manufacturing maker), and the like.

The CRC sequence is configured by 15 bits. The CRC sequence is obtained from values transmitted in the SOF, the ID field, the control field, and the data field.

The CRC delimiter is a delimitation sign configured by a 1-bit recessive and indicating an end of the CRC sequence. It is to be noted that the CRC sequence and the CRC delimiter will be collectively referred to as a CRC field.

The ACK slot is configured by 1 bit. A transmission node performs transmission with the ACK slot recessive. If a reception node can correctly receive a data frame up to the CRC sequence, the reception node performs transmission with the ACK slot dominant. Since a dominant takes priority over a recessive, if the ACK slot is dominant after the transmission, the transmission node can affirm that one of reception nodes has successfully received the data frame.

The ACK delimiter is a delimitation sign configured by a 1-bit recessive and indicating an end of the ACK.

The EOF is configured by 7 bits of recessives and indicates an end of the data frame.

FIG. 2(a) indicates an example of the content of a data field of a frame communicated by a non-MAC-enabled ECU. The data field includes only data 80a without including a MAC.

FIG. 2(b) indicates an example of the content of a data field of a frame communicated by a MAC-enabled ECU. The data field includes data 80b and a MAC 81. The gateway 90 receives a frame having the content indicated by FIG. 2(b). If the gateway 90 transfers the frame to a destination bus to which a MAC-enabled ECU is not connected but a non-MAC-enabled ECU is connected, for example, the gateway 90 transfers a frame from which the MAC in the data field has been removed.

In addition, although the data and the MAC are each 32 bits in FIG. 2(b), this is just an example, and another size may be used, instead. The size of a MAC may be predetermined for each message ID. In addition, the size of a MAC may be determined for each bus. In addition, although the data and the MAC are included in a single frame in (b), the data and the MAC may be included in data frames of different frames and transmitted, instead. In this case, if the gateway 90 transfers the frames to a destination bus to which a MAC-enabled ECU is not connected but a non-MAC-enabled ECU is connected, for example, the gateway 90 may transfer a frame including the data but need not transmit a frame including the MAC.

1.3 Configuration of Non-MAC-Enabled ECU

Figure 3:
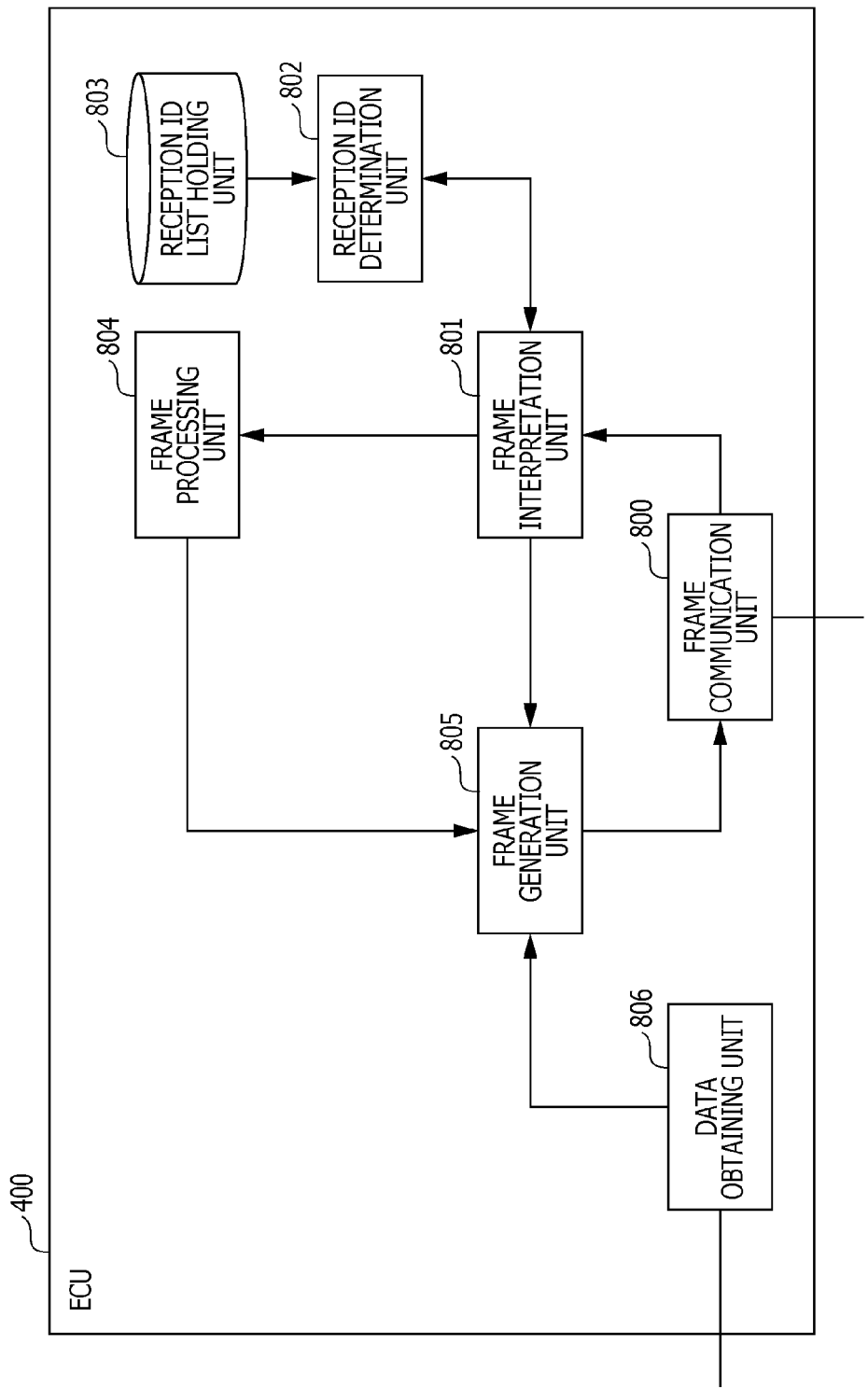
FIG. 3 is a configuration diagram of a non-MAC-enabled ECU (an ECU that does not have a function of processing a MAC) according to the first embodiment.

FIG. 3 is a configuration diagram of the ECU 400, which is a non-MAC-enabled ECU. The ECU 400 does not include a component relating to the function of processing a MAC (the function of generating a MAC and the function of verifying a MAC) and is configured by including a frame communication unit 800, a frame interpretation unit 801, a reception ID determination unit 802, a reception ID list holding unit 803, a frame processing unit 804, a frame generation unit 805, and a data obtaining unit 806. Functions of these components are achieved, for example, by the communication circuit, the processor that executes the control programs stored in the memory, or the digital circuit in the ECU 400.

The frame communication unit 800 communicates, with the bus 40, frames according to the CAN protocol. The frame communication unit 800 receives a frame from the bus 40 bit by bit and transmits the frame to the frame interpretation unit 801. The frame communication unit 800 also transmits, to the bus 40, the content of a frame transmitted from the frame generation unit 805.

The frame interpretation unit 801 receives values of a frame from the frame communication unit 800 and interprets the values of the frame such that the values are mapped in the fields of a frame format specified in the CAN protocol. A value determined to belong to the ID field is transmitted to the reception ID determination unit 802. The frame interpretation unit 801 determines, in accordance with a result of a determination transmitted from the reception ID determination unit 802, whether to transmit the value of the ID field and the data field appearing after the ID field to the frame processing unit 804 or stop receiving the frame after receiving the result of the determination (i.e., stops interpreting the frame). In addition, if determining that a frame is not in accordance with the CAN protocol, the frame interpretation unit 801 instructs the frame generation unit 805 to transmit an error frame. In addition, if receiving an error frame, that is, if interpreting a frame as an error frame on the basis of values of the received frame, the frame interpretation unit 801 discards the frame thereafter, that is, stops interpreting the frame.

The reception ID determination unit 802 receives a value of the ID field transmitted from the frame interpretation unit 801 and determines whether to receive the fields of the frame after the ID field in accordance with a list of message IDs held by the reception ID list holding unit 803. The reception ID determination unit 802 transmits a result of the determination to the frame interpretation unit 801.

The reception ID list holding unit 803 holds a reception ID list, which is a list of IDs (message IDs) received by the ECU 400. When the ECU 400 receives and processes messages having an ID 0x100 or 0x200, the example, a list of the IDs 0x100 and 0x200 are registered to the reception ID list in advance.

The frame processing unit 804 performs a process relating to a function different for each ECU in accordance with data included in a received frame. The ECU 400, which is connected to the doors 410, for example, has a function of issuing an alarm sound when a door opens without the brakes applied. The ECU 400 includes a speaker or the like for issuing an alarm sound. The frame processing unit 804 of the ECU 400 also manages data received from the other ECUs and performs a process for issuing an alarm sound under a certain condition on the basis of open/close states of the doors obtained from the doors 410 or the like. It is to be noted that the frame processing unit 804 may perform a process relating to data regarding a frame other than that described above as an example, instead.

The data obtaining unit 806 obtains data indicating states of the devices, the sensors, and the like connected to the ECU and transmits the data to the frame generation unit 805.

The frame generation unit 805 generates an error frame in accordance with an instruction to transmit an error frame transmitted from the frame interpretation unit 801 and instructs the frame communication unit 800 to transmit the error frame. The frame generation unit 805 also generates a frame while adding a predetermined message ID to a value of data transmitted from the data obtaining unit 806 and transmits the frame to the frame communication unit 800.

It is to be noted that the ECUs 401, 500, 600, and 700 are also non-MAC-enabled ECUs and have basically the same configuration as the ECU 400. The reception ID list held by the reception ID list holding unit 803, however, can be different depending on the ECU. In addition, the process performed by the frame processing unit 804 differs between the ECUs. The frame communication unit 800 of the ECU 401 communicates frames with the bus 40. The frame communication unit 800 of the ECU 500 communicates frames with the bus 50. The frame communication unit 800 of the ECU 600 communicates frames with the bus 60. The frame communication unit 800 of the ECU 700 communicates frames with the bus 70.

1.4 Configuration of MAC-Enabled ECU

Figure 4:
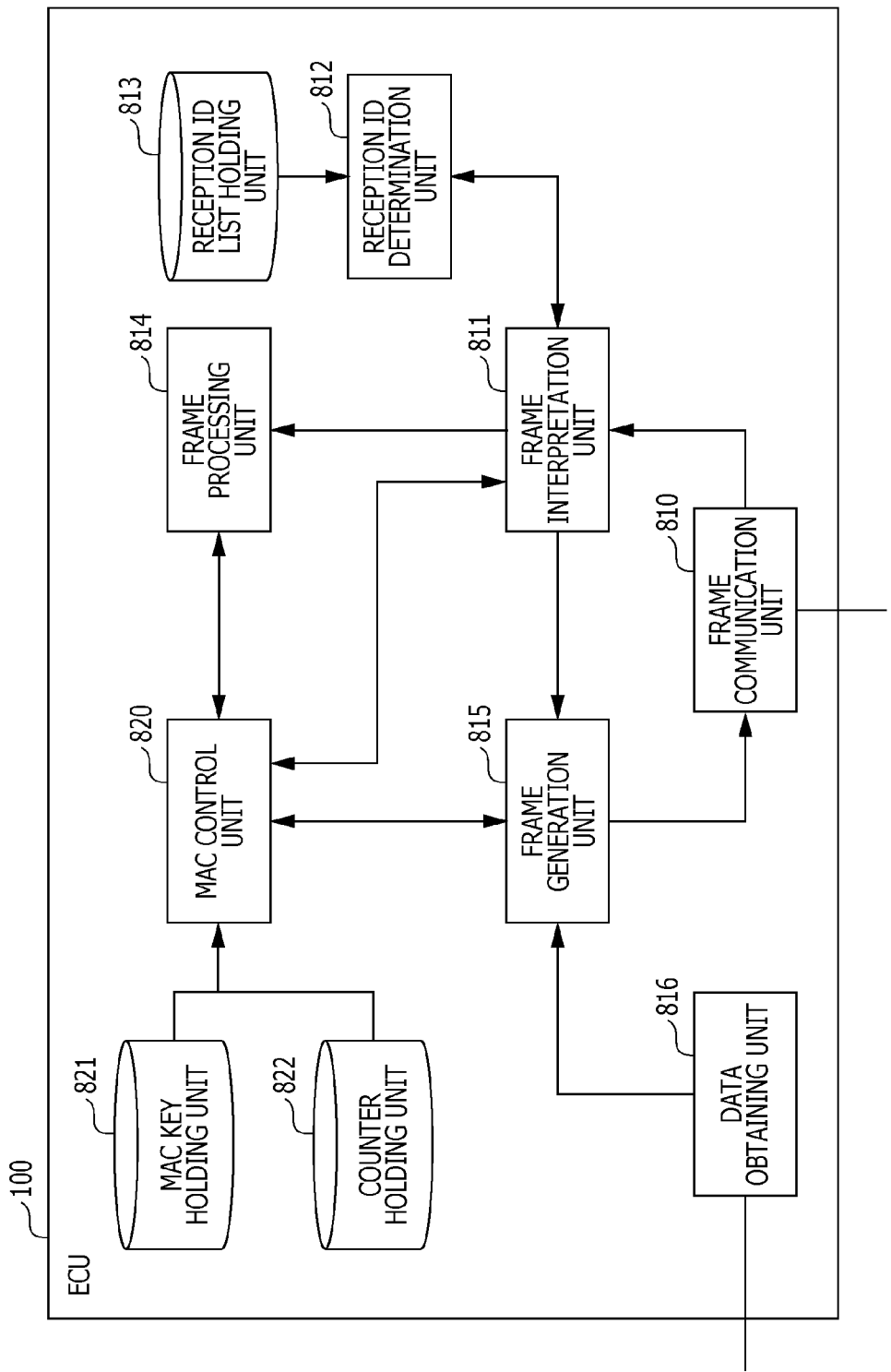
FIG. 4 is a configuration diagram of a MAC-enabled ECU (an ECU having a function of processing a MAC) according to the first embodiment.

FIG. 4 is a configuration diagram of the ECU 100, which is a MAC-enabled ECU. The ECU 100 includes components relating to the function of processing a MAC (the function of generating a MAC and the function of verifying a MAC) and includes a frame communication unit 810, a frame interpretation unit 811, a reception ID determination unit 812, a reception ID list holding unit 813, a frame processing unit 814, a frame generation unit 815, a data obtaining unit 816, a MAC control unit 820, a MAC key holding unit 821, and a counter holding unit 822. Functions of these components are achieved, for example, by the communication circuit, the process that executes the control programs stored in the memory, or the digital circuit in the ECU 100.

The frame communication unit 810, the frame interpretation unit 811, the reception ID determination unit 812, the reception ID list holding unit 813, the frame processing unit 814, the frame generation unit 815, and the data obtaining unit 816 have the same functions as the frame communication section 800, the frame interpretation unit 801, the reception ID determination unit 802, the reception ID list holding unit 803, the frame processing unit 804, the frame generation unit 805, and the data obtaining unit 806, respectively, of the above-described ECU 400, which is a non-MAC-enabled ECU, and description thereof is omitted as necessary.

The frame communication unit 810 communicates, with the bus 10, frames according to the CAN protocol.

The MAC control unit 820 generates a MAC (refer to (b) in FIG. 2) arranged in the data field of a data frame of the CAN and verifies the MAC. When the frame communication unit 810 receives a data frame, the MAC control unit 820 calculates a MAC value for a value obtained by combining a message ID and a value of data, which are the content of a frame obtained from the frame interpretation unit 811, and a counter value held by the counter holding unit 822 using a MAC key held by the MAC key holding unit 821 and compares the calculated MAC value with a MAC value that is the content of the frame obtained from the frame interpretation unit 811. If a result of the comparison does not match, the MAC control unit 820 determines that a message is unauthorized, and stops processing the frame. The MAC control unit 820 then, for example, instructs the frame generation unit 815 to transmit an error frame. When the frame communication unit 810 transmits a data frame, the MAC control unit 820 calculates a MAC value for a value obtained by combining a message ID and a value of data, which are the content of a frame generated by the frame generation unit 815 on the basis of data from the data obtaining unit 816 and a counter value held by the counter holding unit 822 using a MAC key held by the MAC key holding unit 821 and transmits the calculated MAC value to the frame generation unit 815 to set the MAC value to a frame to be transmitted. The MAC control unit 820 calculates a MAC using a MAC key and determines first four bytes of a result of the calculation, for example, as a MAC value. Although an example in which a message ID, a value of data, and a counter value held by the counter holding unit 822 are used to calculate a MAC has been described here, one or two of these may be used to calculate a MAC, or the content of another field (e.g., the DLC, etc.) of a frame may be used to calculate a MAC, instead. As a method for calculating a MAC, a hash-based message authentication code (HMAC), a cipher block chaining message authentication code (CBC-MAC), or the like, for example, may be used.

The MAC key holding unit 821 holds a MAC key necessary to calculate a MAC value.

The counter holding unit 822 holds counter values necessary to calculate a MAC value. If the ECU 100 communicates a frame without an error, a counter value held by the counter holding unit 822 is increased by 1 (incremented). A counter value is held, for example, for each message ID of a frame to be communicated.

The frame generation unit 815 generates an error frame in accordance with an instruction to transmit an error frame transmitted from the frame interpretation unit 811 and instructs the frame communication unit 810 to transmit the error frame. The frame generation unit 815 also generates a frame while adding a predetermined message ID to a value of data transmitted from the data obtaining unit 816 and sets, to the frame, a MAC value transmitted from the MAC control unit 820. The frame generation unit 815 then transmits the frame to the frame communication unit 810.

It is to be noted that the ECUs 101, 200, 201, 300, and 301 are also MAC-enabled ECUs and have basically the same configuration as the above-described ECU 100. The reception ID list held by the reception ID list holding unit 813, however, can be different depending on the ECU. In addition, the process performed by the frame processing unit 814 differs between the ECUs. In addition, the MAC key holding unit 821 of each MAC-enabled ECU holds a different MAC key for each message ID to be processed by the ECU. It is to be noted that the MAC key holding unit 821 of each MAC-enabled ECU may hold the same MAC key for the bus connected to the ECU regardless of the message ID, or the MAC key holding units 821 of the MAC-enabled ECUs may have the same MAC key for any bus, instead. The frame communication unit 810 of the ECU 101 communicates frames with the bus 10. The frame communication units 810 of the ECUs 200 and 201 communicate frames with the bus 20. The frame communication units 810 of the ECUs 300 and 301 communicate frames with the bus 30.

1.5 Configuration of Gateway 90

Figure 5:
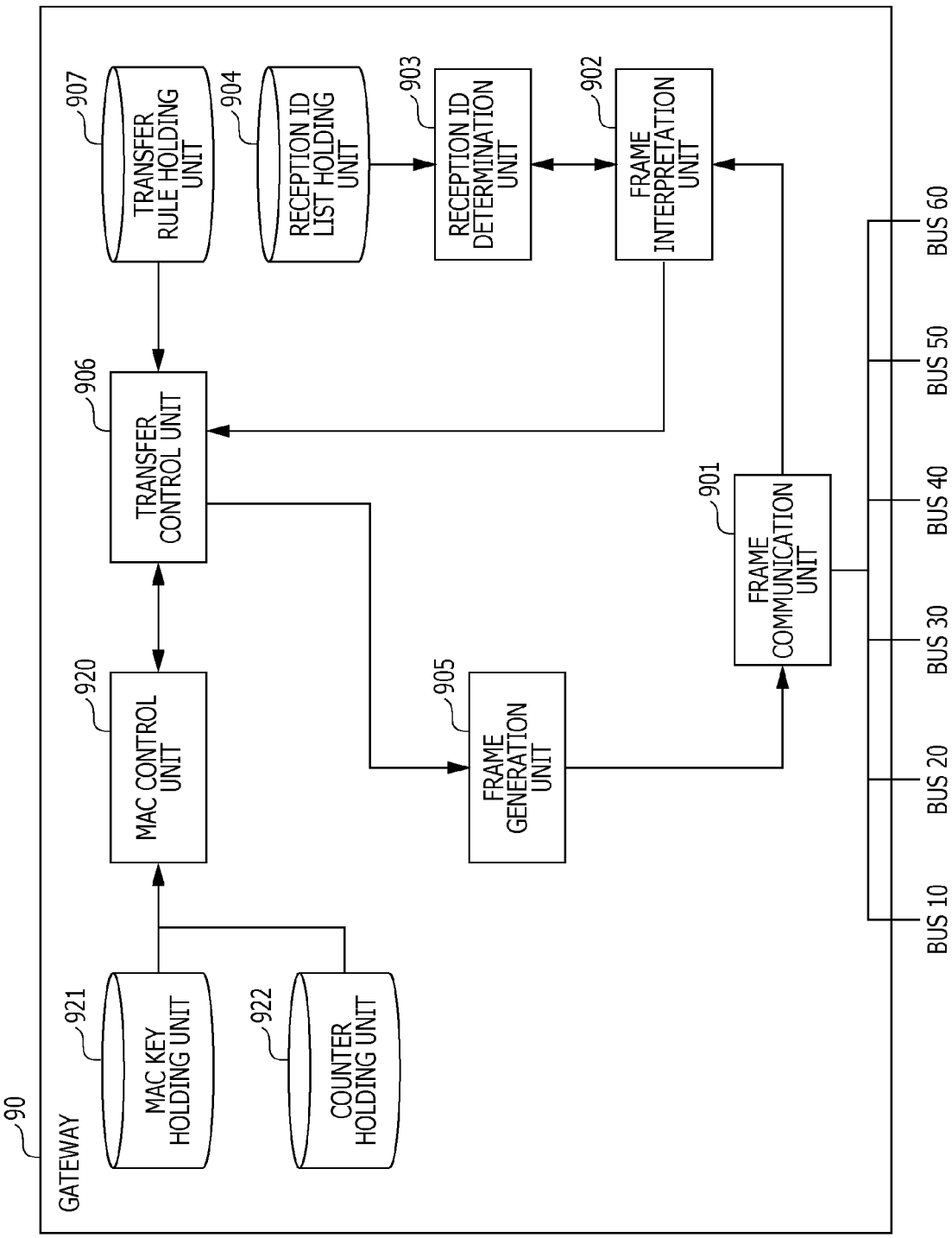
FIG. 5 is a configuration diagram of a gateway according to the first embodiment.

FIG. 5 is a configuration diagram of the gateway 90. The gateway 90 includes a frame communication unit 901, a frame interpretation unit 902, a reception ID determination unit 903, a reception ID list holding unit 904, a frame generation unit 905, a transfer control unit 906, a transfer rule holding unit 907, a MAC control unit 920, a MAC key holding unit 921, and a counter holding unit 922. Functions of these components are achieved, for example, by a communication circuit, a processor that executes control programs stored in a memory, or a digital circuit in the gateway 90.

The frame communication unit 901 communicates frames according to the CAN protocol with the bus 10, the bus 20, the bus 30, the bus 40, the bus 50, the bus 60, and the bus 70. The frame communication unit 901 functions as a reception unit that receives a frame from a bus bit by bit and that transmits the frame to the frame interpretation unit 902. The frame communication unit 901 also transmits, on the basis of destination bus information indicating a destination bus and a frame transmitted from the frame generation unit 905, the content of the frame to the destination bus bit by bit, which is one of the bus 10, the bus 20, the bus 30, the bus 40, the bus 50, the bus 60, and the bus 70.

The frame interpretation unit 902 receives values of a frame from the frame communication unit 901 and interprets the values of the frame such that the values are mapped in the fields of a frame format specified in the CAN protocol. A value determined to belong to the ID field is transmitted to the reception ID determination unit 903. The frame interpretation unit 902 determines, in accordance with a result of a determination transmitted from the reception ID determination unit 903, whether to transmit the value of the ID field and the data field (data) appearing after the ID field to the transfer control unit 906 or stop receiving the frame after receiving the result of the determination. In addition, if determining that a frame is not in accordance with the CAN protocol, the frame interpretation unit 902 instructs the frame generation unit 905 to transmit an error frame. In addition, if receiving an error frame, that is, if interpreting a frame as an error frame on the basis of values of the received frame, the frame interpretation unit 902 discards the frame thereafter, that is, stops interpreting the frame.

The reception ID determination unit 903 receives a value of the ID field transmitted from the frame interpretation unit 902 and determines whether to receive the fields of the frame after the ID field in accordance with a list of message IDs held by the reception ID list holding unit 904. The reception ID determination unit 903 transmits a result of the determination to the frame interpretation unit 902.

The reception ID list holding unit 904 holds a reception ID list, which is a list of message IDs received by the gateway 90. Message IDs of frames to be received by the gateway 90 from the buses (buses 10 to 70) are registered in the reception ID list. It is to be noted that the reception ID list holding unit 904 may hold a different reception ID list for each bus or may hold one reception ID list for all the buses.

The transfer control unit 906 selects an ID (message ID) of a received frame in accordance with a transfer rule held by the transfer rule holding unit 907 and a destination bus in accordance with a source bus (i.e., a bus that has received the frame) and transmits destination bus information indicating the destination bus, a message ID and data (the content of the data field) transmitted from the frame interpretation unit 902, and the DLC (data length) to the frame generation unit 905. The transfer control unit 906 refers to bus information (information indicating whether each bus is a MAC-enabled bus or a non-MAC-enabled bus) and transfer rule information held by the transfer rule holding unit 907 and checks whether a source bus and a destination bus of a received frame are MAC-enabled buses. A MAC-enabled bus is a bus to which a MAC-enabled ECU is connected, and a non-MAC-enabled bus is a bus to which a MAC-enabled ECU is not connected. A non-MAC-enabled ECU can be connected to the non-MAC-enabled bus.

If a source bus is a MAC-enabled bus and a destination bus is non-MAC-enabled, the transfer control unit 906 requests the MAC control unit 920 to perform MAC verification. If the MAC verification performed by the MAC control unit 920 is successful (i.e., a MAC included in the frame received from the source bus matches a calculated MAC), the transfer control unit 906 determines that the frame (message) is authorized, and instructs the frame generation unit 905 to transfer the data frame from which the MAC has been removed. If the MAC verification fails, the transfer control unit 906 determines that the frame is unauthorized, and stops transferring the frame.

In addition, if the source bus is a MAC-enabled bus and the destination bus is a MAC-enabled bus, the transfer control unit 906 requests the MAC control unit 920 to perform MAC verification. If the MAC verification performed by the MAC control unit 920 is successful, the transfer control unit 906 determines that the frame is authorized, and instructs the frame generation unit 905 to transfer the data frame without removing a MAC. If the MAC verification fails, the transfer control unit 906 determines that the frame is unauthorized, and stops transferring the frame. When a MAC is not removed and a different MAC key is prepared for each bus, a frame is transferred while replacing the MAC with a MAC generated using a MAC key corresponding to the destination bus.

In addition, if the source bus is a non-MAC-enabled bus and the destination bus is a MAC-enabled bus, the transfer control unit 906 requests the MAC control unit 920 to perform MAC generation. The transfer control unit 906 then instructs the frame generation unit 905 to transfer a frame while adding a MAC value generated by the MAC control unit 920 to the data field.

In addition, if the source bus is a non-MAC-enabled bus and the destination bus is a non-MAC-enabled bus, the transfer control unit 906 instructs the frame generation unit 905 to transfer a frame without requesting the MAC control unit 920 to perform verification and generation of a MAC.

The MAC control unit 920 has the functions of generating a MAC and verifying a MAC. If the transfer control unit 906 requests (commands) the MAC control unit 920 to perform MAC verification, the MAC control unit 920 calculates a MAC value for a value obtained by combining a message ID and a value of data transmitted from the transfer control unit 906 and a counter value (a counter value managed in a counter list 9220 for the message ID) held by the counter holding unit 922 using a MAC key (a MAC key managed in a MAC key list 9210 for the message ID) held by the MAC key holding unit 921. The MAC control unit 920 then compares the calculated MAC value with a MAC value in the data field of a received frame transmitted from the transfer control unit 906. If a result of the comparison matches, the MAC control unit 920 notifies the transfer control unit 906 that the verification has been successful. If not, the MAC control unit 920 notifies the transfer control unit 906 that the verification has failed. In addition, if the transfer control unit 906 requests (commands) the MAC control unit 920 to perform MAC generation, the MAC control unit 920 calculates a MAC value for a value obtained by combining a message ID and a value of data transmitted from the transfer control unit 906 and a counter value (a counter value managed in the counter list 9220 for the message ID) held by the counter holding unit 922 using a MAC key (a MAC key managed in the MAC key list 9210 for the message ID) held by the MAC key holding unit 921 and transmits the calculated MAC value to the transfer control unit 906. The MAC control unit 920 calculates a MAC using a MAC key and determines first four bytes of a result of the calculation, for example, as a MAC value. Although an example in which a message ID, a value of data, and a counter value held by the counter holding unit 922 are used to calculate a MAC has been described here, one or two of these may be used to calculate a MAC, or the content of another field (e.g., the DLC, etc.) of a frame may be used to calculate a MAC, instead. As a method for calculating a MAC, an HMAC, a CBC-MAC, or the like, for example, may be used.

The MAC key holding unit 921 holds the MAC key list 9210 that manages MAC keys necessary to calculate a MAC value. The MAC key list 9210 will be described later with reference to FIG. 8.

The counter holding unit 922 holds the counter list 9220 that manages counter values necessary to calculate a MAC value. The counter list 9220 will be described later with reference to FIG. 9. A counter value is held, for example, for each message ID of a frame to be communicated in each bus. If the gateway 90 communicates a frame without an error, the counter holding unit 922 increases (increments) a counter value of a corresponding message ID in the counter list 9220 by 1. The counter holding unit 922 may hold a counter list 9220, for example, for each bus.

The transfer rule holding unit 907 holds the transfer rule information, which is information indicating a rule about transfer of a frame for each bus, and the bus information indicating whether each bus is a MAC-enabled bus or a non-MAC-enabled bus. FIG. 6 illustrates an example of the bus information, and FIG. 7 illustrates an example of the transfer rule information.

The frame generation unit 905 generates an error frame in accordance with an instruction to transmit an error frame transmitted from the frame interpretation unit 902 and instructs the frame communication unit 901 to transmit the error frame. The frame generation unit 905 also generates, in accordance with a request transmitted from the transfer control unit 906, a transmission frame using a message ID and the content of the data field transmitted from the transfer control unit 906 and transmits the transmission frame and destination bus information (a bus ID that is an identifier of a destination bus) to the frame communication unit 901.

1.6 Bus Information

FIG. 6 illustrates an example of the bus information held by the transfer rule holding unit 907 of the gateway 90. Bus information 9070 illustrated in FIG. 6 is information indicating, for each bus, whether the bus is a MAC-enabled bus or a non-MAC-enabled bus.

The example illustrated in FIG. 6 is an example in which the reference numeral of each bus is an identifier (bus ID) of the bus. In the example illustrated in FIG. 6, it is indicated that the bus 10, whose bus ID is 10, is a MAC-enabled bus and MAC-enabled ECUs are connected to the bus 10. That is, it is indicated that the ECUs 100 and 101 connected to the bus 10 are MAC-enabled ECUs.

In addition, it is indicated that the bus 40, whose bus ID is 40, is a non-MAC-enabled bus and a MAC-enabled ECU is not connected to the bus 40. That is, the ECUs 400 and 401 connected to the bus 40 are non-MAC-enabled ECUs.

1.7 Transfer Rule Information

FIG. 7 illustrates an example of the transfer rule information held by the transfer rule holding unit 907 of the gateway 90. In transfer rule information 9071 illustrated in FIG. 7, a source bus, destination buses, and IDs (message IDs) of data frames (messages) to be transferred are associated with one another. The transfer rule information 9071 serves as a reference for the gateway 90 to select, from the plurality of buses, a destination bus to which a received frame is to be transferred.

Source bus IDs illustrated in FIG. 7 are bus IDs indicating buses from which frames received by the gateway 90 have been received. Destination bus IDs illustrated in FIG. 7 are bus IDs indicating buses to which frames received by the gateway 90 are to be transferred (transmitted). After a destination bus ID is transmitted to the frame communication unit 901 as destination bus information, the frame communication unit 901 transmits a frame to a bus corresponding to the destination bus information. The example illustrated in FIG. 7 is an example in which the reference numeral of each bus illustrated in FIG. 1 is a bus ID of the bus. The gateway 90 determines, in accordance with the transfer rule information, whether to perform transfer, which bus is to be selected as a destination bus, and the like.

The example illustrated in FIG. 7 indicates, for example, that all messages whose source bus is the bus 10 are to be transferred with the bus 20, the bus 30, and the bus 70 determined as destination buses. In addition, it is indicated that, among all the messages whose source bus is the bus 10, only messages whose message IDs are 0x001, 0x002, or 0x003 are to be transferred with the bus 40, the bus 50, and the bus 60 determined as destination buses, and other messages whose source bus is the bus 10 are not to be transferred to the bus 40, the bus 50, or the bus 60. In addition, it is indicated that all messages whose source bus is the bus 30 are to be transferred with the bus 10, the bus 20, the bus 40, and the bus 70 determined as destination buses. In addition, it is indicated that all messages whose source bus is the bus 30 are not to be transferred to the bus 50 or 60. In addition, it is indicated that messages whose source bus is the bus 50 are not to be transferred to any bus.

1.8 MAC Key List

FIG. 8 illustrates an example of the MAC key list held by the MAC key holding unit 921 of the gateway 90. In the MAC key list 9210 illustrated in FIG. 8, a MAC key corresponding to each message ID is registered as a list for the message ID. The MAC control unit 920 uses the MAC key list 9210 to generate and verify a MAC.

Although an example in which a different MAC key is individually held for each message ID is illustrated in FIG. 8, the MAC key holding unit 921 may hold an individual MAC key for each bus, instead. In this case, bus IDs and key values corresponding to the bus IDs are registered to the MAC key list 9210. If an individual MAC key is managed for each bus, the gateway 90, when transferring a frame, newly generates a MAC using a MAC key corresponding to a destination bus and transmits a transmission frame while setting the generated MAC to the transmission frame.

1.9 Counter List

FIG. 9 illustrates an example of the counter list held by the counter holding unit 922 of the gateway 90. In the counter list 9220 illustrated in FIG. 9, a counter value corresponding to each message ID is recorded as a list for the message ID. The MAC control unit 920 uses the counter list 9220 to generate and verify a MAC.

Although an example in which an individual counter value is held for each message ID is illustrated in FIG. 9, the counter holding unit 922 may hold an individual counter value for each bus, instead. In this case, bus IDs and counter values corresponding to the bus IDs are recorded in the counter list 9220.

1.10 Example of Operation Relating to Transfer of Frame

Figure 10:
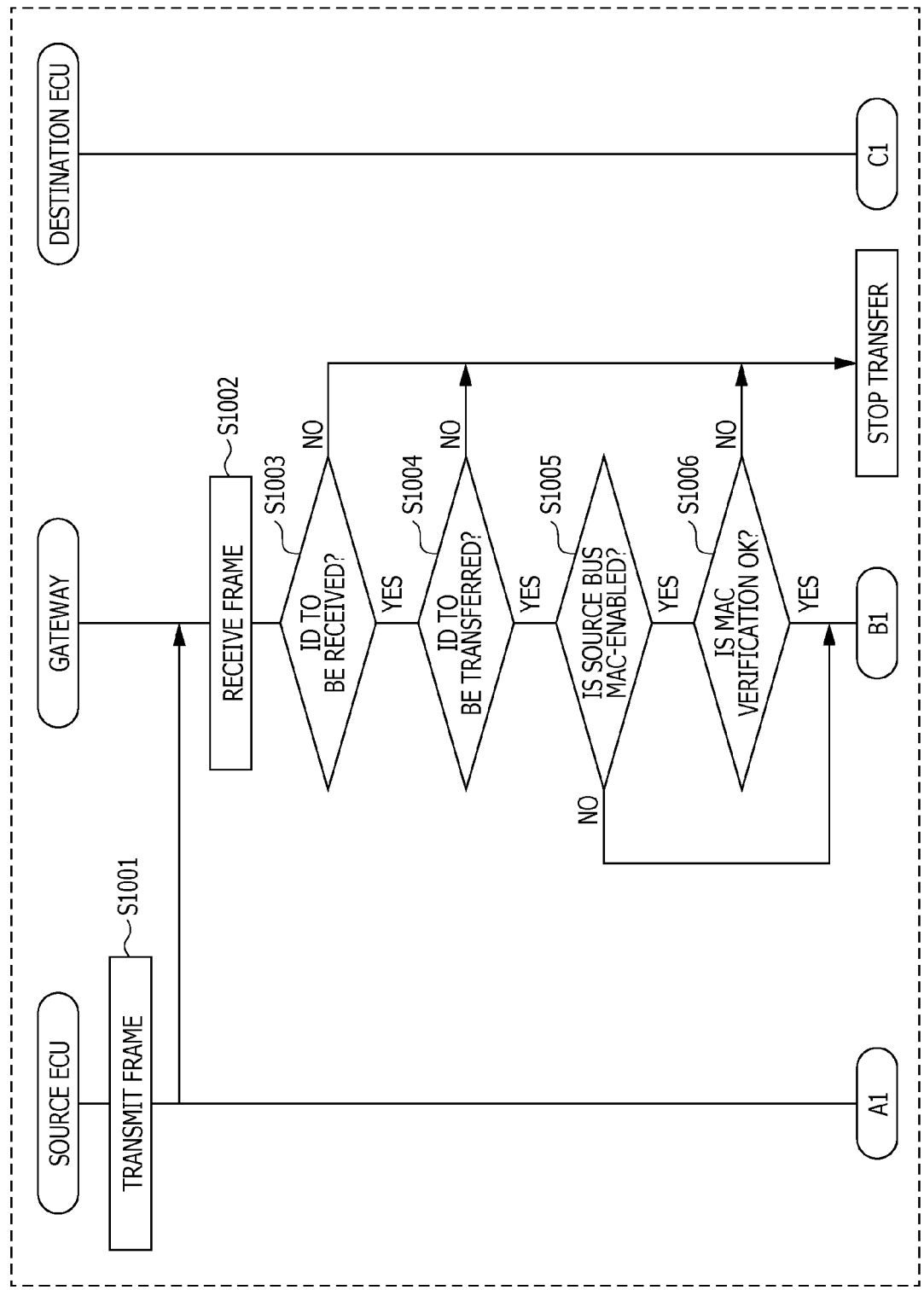
FIG. 10 is a sequence diagram illustrating an example of an operation relating to transfer of a frame performed by the gateway according to the first embodiment (continues to FIG. 11)
Figure 11:
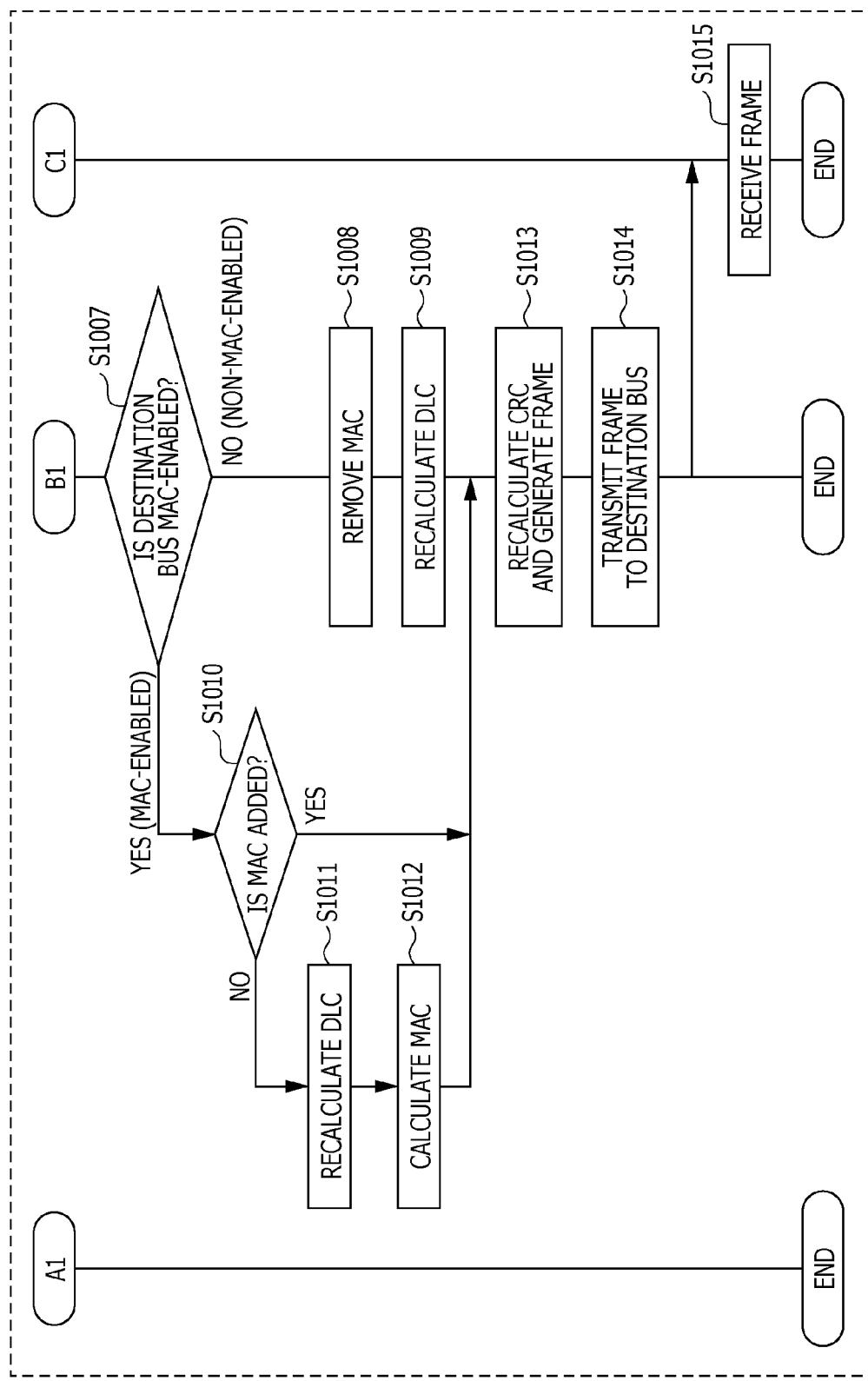
FIG. 11 is a sequence diagram illustrating the example of the operation relating to the transfer of a frame performed by the gateway according to the first embodiment (continued from FIG. 10)

FIGS. 10 and 11 illustrate an example of an operation in which the gateway 90 receives, from a bus, a frame transmitted by a source ECU and transfers the frame to another bus to which a destination ECU is connected. The bus and the other bus can be MAC-enabled buses or non-MAC-enabled buses. In addition, a MAC-enabled ECU and a non-MAC enabled ECU can each be a source ECU or a destination ECU. The operation of each device will be described hereinafter with reference to FIGS. 10 and 11.

First, the source ECU transmits a frame (message) to the bus to which the source ECU is connected (step S1001). In CAN communication, a frame is transmitted through broadcasting, that is, any node connected to a bus can receive the frame. The gateway 90 is connected to the bus to which the source ECU is connected, and the frame communication unit 901 of the gateway 90 receives the frame from the source ECU (step S1002).

The reception ID determination unit 903 of the gateway 90 determines whether the frame is a frame to be received (a frame including an ID to be received) on the basis of whether a message ID of the received frame (message) transmitted from the frame interpretation unit 902 is written in the reception ID list held by the reception ID list holding unit 904 (step S1003). If the frame is not a frame to be received, the gateway 90 stops transferring the received frame (i.e., does not transfer the frame).

If it is determined in step S1003 that the frame is a frame to be received, the transfer control unit 906 of the gateway 90 refers to the transfer rule information 9071 held by the transfer rule holding unit 907. The transfer control unit 906 determines whether the message ID of the frame indicates that the frame is to be transferred to any bus and, if so, selects the destination bus (step S1004). If the message ID of the frame does not indicate that the frame is to be transferred, the gateway 90 stops transferring the received frame.

If it is determined in step S1004 that the message ID of the frame indicates that the frame is to be transferred, the transfer control unit 906 refers to the bus information 9070 held by the transfer rule holding unit 907. The transfer control unit 906 determines whether the source bus, which has received the frame, is a MAC-enabled bus (step S1005), and, if so, the process proceeds to step S1006. If the source bus is not a MAC-enabled bus (i.e., if the source bus is a non-MAC-enabled bus), processing in step S1006 is skipped, and the process proceeds to step S1007. In step S1006, the MAC control unit 920 of the gateway 90 calculates a MAC value from the MAC key list 9210 held by the MAC key holding unit 921 and the counter list 9220 held by the counter holding unit 922 using a MAC key and a counter corresponding to the message ID of the received frame and compares the calculated MAC value with a MAC in the data field of the received frame to verify the received frame (MAC verification). If it is determined as a result of the MAC verification that the frame is unauthorized (if the verification fails), the gateway 90 stops transferring the frame. If it is determined as a result of the MAC verification that the frame is authorized (if the verification is successful), the process proceeds to step S1007. It is to be noted that if the verification is successful, the gateway 90 increases (increments) the counter value corresponding to the message ID of the frame in the counter list 9220 by 1 for later MAC verification.

In step S1007, the transfer control unit 906 refers to the bus information 9070 held by the transfer rule holding unit 907 and determines whether the destination bus is a MAC-enabled bus. If it is determined as a result of the determination made in step S1007 that the destination bus is a MAC-enabled bus, the process proceeds to step S1010. If it is determined that the destination bus is not a MAC-enabled bus, the process proceeds to step S1008.

In step S1008, the transfer control unit 906 removes a part of the data field of the frame corresponding to the MAC. Next, the transfer control unit 906 subtracts the size (data length) of the MAC removed in step S1008 from a value of the DLC (step S1009), and the process proceeds to step S1013. It is to be noted that if a MAC is not added to the data field of the frame received by the gateway 90 (i.e., if the source bus is a non-MAC-enabled bus), the removal of the MAC and the subtraction of the size of the MAC from the DLC in steps S1008 and S1009, respectively, are not performed.

In step S1010, the transfer control unit 906 checks whether a MAC is added to the frame received from the source bus. If a MAC is not added, the transfer control unit 906 requests the MAC control unit 920 to generate a MAC to be included in a transmission frame to be transmitted to the destination bus, and the process proceeds to step S1011. If a MAC is added, the process proceeds to step S1013.

In step S1011, the MAC control unit 920 recalculates the size of the data field that will be increased as a result of the addition of a MAC and sets the value to the DLC. Next, the MAC control unit 920 calculates a MAC value for a value obtained by combining the message ID and the value of data transmitted from the transfer control unit 906 and the counter value corresponding to the message ID in the counter list 9220 held by the counter holding unit 922 using a MAC key corresponding to the message ID in the MAC key list 9210 held by the MAC key holding unit 921 and transmits the calculated MAC value to the transfer control unit 906 (step S1012). Upon receiving the MAC value, the transfer control unit 906 adds the MAC to the data field.

If a MAC is added to the received frame in step S1010, or after step S1009 or step S1012, the transfer control unit 906 transmits the message ID, the data field, the DLC, and destination bus information (destination bus ID) to the frame generation unit 905. As a result, the frame generation unit 905 generates a transmission frame by recalculating a CRC using the message ID and the data field transmitted from the transfer control unit 906 and transmits the destination bus information (destination bus ID) and the transmission frame to the frame communication unit 901 (step S1013).

Next, the frame communication unit 901 of the gateway 90 transmits the transmission frame generated by the frame generation unit 905 to a bus (i.e., a destination bus) indicated by the destination bus information (step S1014). As a result, the gateway 90 achieves the transfer of a frame between buses.

After step S1014, a destination ECU connected to the destination bus receives the frame transmitted (transferred) from the gateway 90 (step S1015).

1.11 Advantageous Effects Produced by First Embodiment

In the vehicle network system 1 according to the first embodiment, the transfer control unit 906, the frame generation unit 905, and the frame communication unit 901 of the gateway 90 together function as a transfer unit that removes, from the content of a frame (message) received from the frame communication unit 901 that functions as a reception unit, verification information (e.g., a MAC) used to verify the frame and transfers the frame to a destination bus or that adds verification information to the content of the frame and transfers the frame to a destination bus. If a certain removal condition for removing verification information is satisfied with respect to a first frame (e.g., a frame including a MAC) including verification information received by the reception unit, the transfer unit can transfer a frame by generating a second frame (e.g., a frame that does not include a MAC) including information based on the content of the first frame other than the verification information and transmitting the second frame to the destination bus. In addition, if a certain addition condition for adding verification information is satisfied with respect to a frame that does not include verification information received by the reception unit, the transfer unit can transfer a frame by generating a frame including information based on the content of the frame and the verification information and transmitting the generated frame to the destination bus. If the certain removal condition is satisfied, for example, the transfer unit can transmit, to the destination bus, a second frame that includes the content of the data field other than a MAC of the first frame and that does not include a MAC. If a MAC-enabled ECU is not connected to a destination bus when the gateway 90 transfers a frame (i.e., if the destination bus is a non-MAC-enabled bus), the frame is thus transferred with the MAC removed, and the amount of traffic of the destination bus can be suppressed. That is, since a MAC is removed when a frame is transferred to a particular bus, an ECU connected to the bus need not process the MAC. This can lead to achievement of efficient ECU arrangement in a vehicle network system. In addition, since the gateway 90 verifies, when transferring a frame, a MAC and, if the verification fails, stops transferring the unauthorized frame, a certain level of security can be enhanced even if a MAC is removed and a frame is transferred. In addition, since the gateway 90 does not transfer an unauthorized frame if verification of a MAC fails, a processing load of an ECU connected to a destination bus for handling an unauthorized frame can be reduced.

It is to be noted that if the certain removal condition for removing verification information is not satisfied with respect to a first frame including verification information received by the reception unit, the above-described transfer unit of the gateway 90 can generate a second frame including information based on the content of the first frame other than the verification information and verification information generated using a key shared with an ECU connected to a destination bus and transmit the second frame to the destination bus. As a result, the security of frames can be enhanced.

Second Embodiment

An embodiment as a modification of the vehicle network system 1 described in the first embodiment will be described hereinafter.

In the first embodiment, if a destination bus is a non-MAC-enabled bus, the gateway device removes a MAC, which is verification information in a frame, when transferring the frame. In the second embodiment, on the other hand, a condition that a bus occupation rate of a destination bus be higher than a certain value is added as a certain removal condition for removing a MAC. The gateway device detects a communication state of each bus connected thereto and measures or calculates a degree of occupation of each bus (e.g., the percentage of a period for which the bus is not in an idle state) as necessary. The gateway device then uses the degree of occupation of each bus as the bus occupation rate of the bus to determine whether to remove a MAC when transferring a frame.

Components of a vehicle network system including a gateway device according to the present embodiment are substantially the same as in the first embodiment, and the same reference numerals as in the first embodiment will be used herein. Differences from the first embodiment will be described hereinafter, and elements that are not described herein are the same as in the first embodiment.

2.1 MAC Removal Condition List

The transfer rule holding unit 907 of the gateway 90 according to the present embodiment holds a MAC removal condition list 9072 as well as the bus information 9070 and the transfer rule information 9071.

FIG. 12 illustrates an example of the MAC removal condition list held by the transfer rule holding unit 907 of the gateway 90. The MAC removal condition list 9072 illustrated in FIG. 12 is information in which a destination bus ID (a bus ID of a destination bus) and a MAC removal condition are associated with each other for each bus that is a MAC-enabled bus. The example illustrated in FIG. 12 is an example in which the reference numeral of each bus illustrated in FIG. 1 is an identifier (bus ID) of the bus.

The example illustrated in FIG. 12 indicates that when the bus 10, whose bus ID is 10, is selected as a destination bus, a MAC is removed if a bus occupation rate of the bus 10 is 50% or more. When transferring a frame to the bus 10, which is a MAC-enabled bus, therefore, the gateway 90 transfers the frame after removing a MAC if the bus occupation rate of the bus 10 is 50% or more. In addition, the example illustrated in FIG. 12 indicates that when the bus 20, whose bus ID is 20, is selected as a destination bus, a MAC is removed if a bus occupation rate of the bus 20 is 40% or more. FIG. 12 illustrates only an example of MAC removal conditions, and the gateway 90 can set a MAC removal condition that a bus occupation rate of a destination bus be higher than a predetermined value (e.g., 50%), and the predetermined value may be different between the buses.

The transfer control unit 906 of the gateway 90 according to the present embodiment has a function of calculating a bus occupation rate of a destination bus and applies MAC removal conditions relating to bus occupation rates indicated by the MAC removal condition list 9072 as well as the MAC removal condition described in the first embodiment that a destination bus be a non-MAC-enabled bus. It is to be noted that the gateway 90 may determine whether to remove a MAC using only the MAC removal conditions relating to bus occupation rates.

Figure 13:
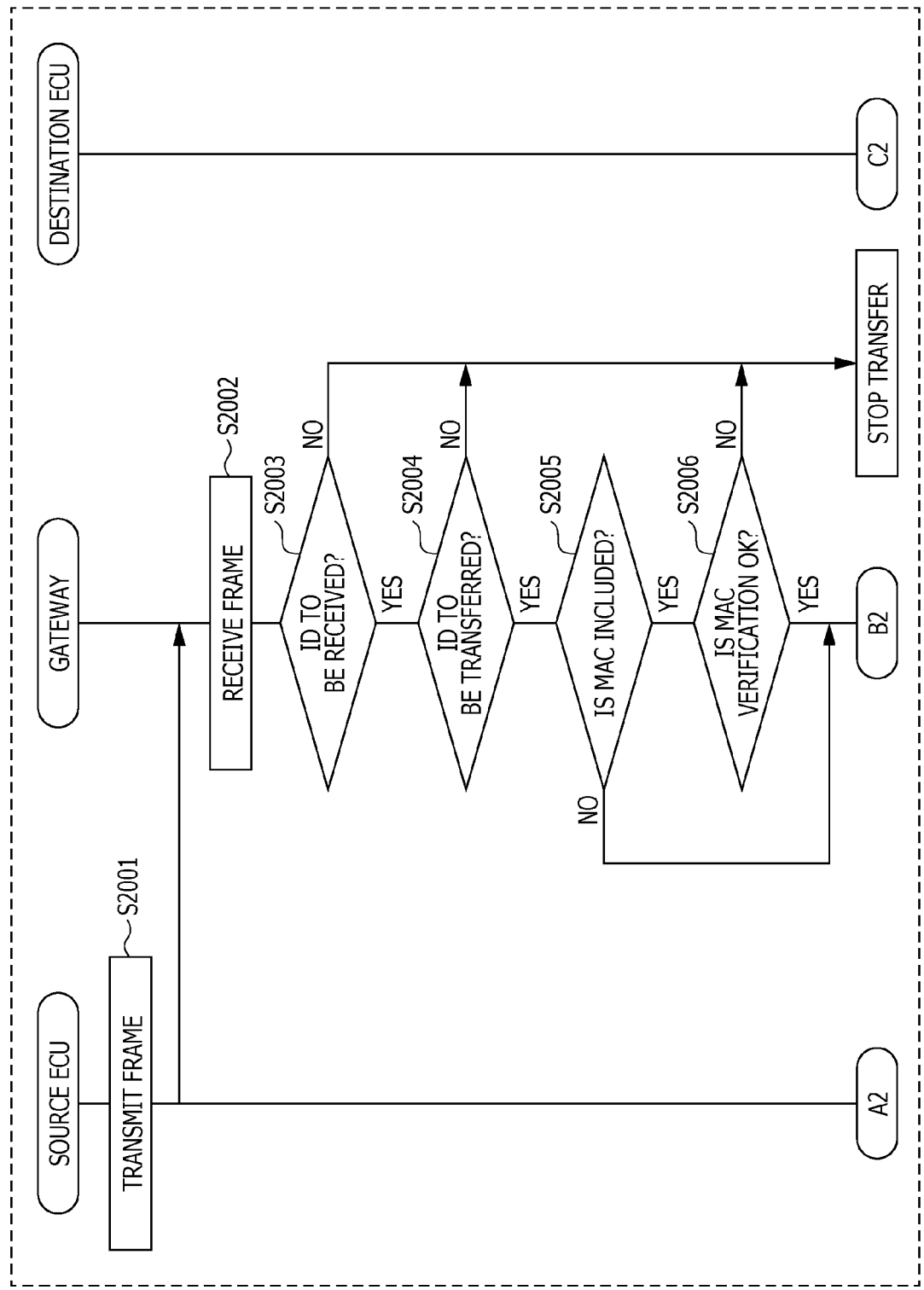
FIG. 13 is a sequence diagram illustrating an example of an operation relating to transfer of a frame performed by the gateway according to the second embodiment (continues to FIG. 14)
Figure 14:
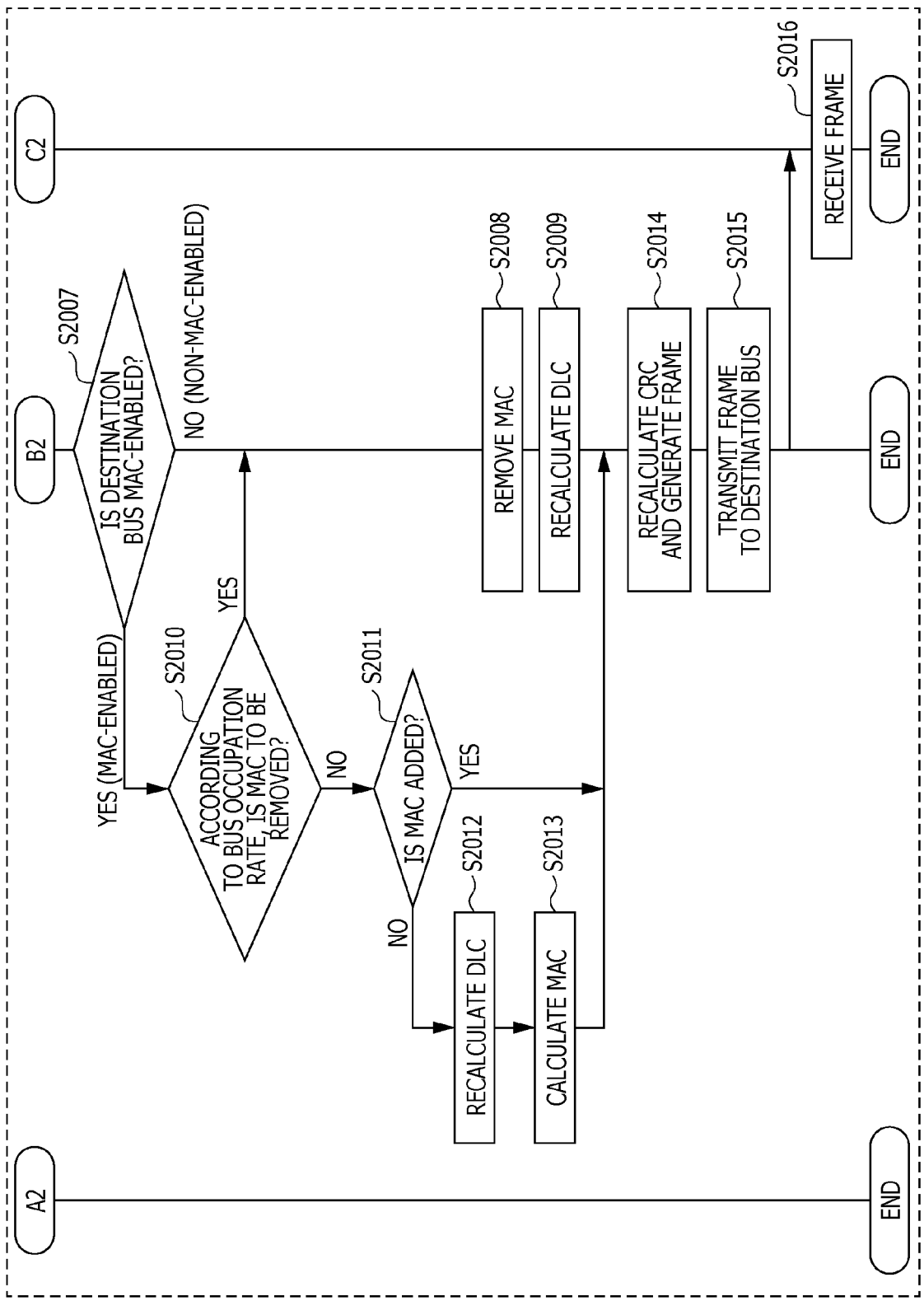
FIG. 14 is a sequence diagram illustrating the example of the operation relating to the transfer of a frame performed by the gateway according to the second embodiment (continued from FIG. 13)

2.2 Example of Transfer Operation When MAC Removal Condition List is used when Frame is Transferred FIGS. 13 and 14 illustrate an example of an operation in which the gateway 90 receives, from a bus, a frame transmitted by a source ECU and transfers the frame to another bus to which a destination ECU is connected while referring to the MAC removal condition list. The bus and the other bus can each be MAC-enabled buses or non-MAC-enabled buses. In addition, a MAC-enabled ECU and a non-MAC enabled ECU can each be a source ECU or a destination ECU. The operation of each device will be described hereinafter with reference to FIGS. 13 and 14. It is to be noted that steps S2001 to S2004 are the same as steps S1001 to S1004, respectively, described in the first embodiment, and description thereof is omitted as necessary.

The frame communication unit 901 of the gateway 90 receives, from a source bus, a frame transmitted by a source ECU in step S2001 (step S2002).

If the received frame is a frame to be received (step S2003), the transfer control unit 906 of the gateway 90 refers to the transfer rule information 9071 and determines whether a message ID of the frame indicates that the frame is to be transferred to another bus. If the received frame is a frame to be transferred, the transfer control unit 906 selects a destination bus (step S2004).

If it is determined in step S2004 that the message ID of the frame indicates that the frame is to be transferred, the transfer control unit 906 determines whether the frame includes a MAC (step S2005). If the frame includes a MAC, the process proceeds to step S2006. If the frame does not include a MAC, processing in step S2006 is skipped, and the process proceeds to step S2007. The transfer rule holding unit 907 determines whether the received frame includes a MAC by, for example, referring to the bus information 9070 held by the transfer rule holding unit 907 and determining whether the source bus, which has received the frame, is a MAC-enabled bus. If the source bus is a MAC-enabled bus in this case, for example, the transfer rule holding unit 907 determines that the received frame includes a MAC. If the source bus is a non-MAC-enabled bus, the transfer rule holding unit 907 determines that the received frame includes a MAC. It is to be noted that if a case is assumed in which another gateway device having the same function as the gateway 90 is connected to the source bus, a MAC might be removed in accordance with a bus occupation rate even if the source bus is a MAC-enabled bus. The transfer control unit 906, therefore, may determine whether a MAC is added to a frame on the basis of a value of the DLC if the size of data in a frame is predetermined for each message ID. In addition, the gateway device in the vehicle network system 1 according to the present embodiment may include, in a frame to be transmitted to a destination bus, information indicating whether a MAC is included in a frame. In this case, the transfer control unit 906 can determine whether a received frame includes a MAC on the basis of this information.

In step S2006, the MAC control unit 920 of the gateway 90 verifies the received frame (MAC verification) by calculating a MAC value from the MAC key list 9210 and the held counter list 9220 using a MAC key and a counter corresponding to the message ID of the received frame and comparing the calculated MAC value and a MAC in the data field of the received frame. If it is determined as a result of the MAC verification that the frame is unauthorized (if the verification fails), the gateway 90 stops transferring the frame. If it is determined as a result of the MAC verification that the frame is authorized (if the verification is successful), the process proceeds to step S2007.

In step S2007, the transfer control unit 906 refers to the bus information 9070 held by the transfer rule holding unit 907 and determines whether the destination bus is a MAC-enabled bus. If it is determined as a result of the determination made in step S2007 that the destination bus is a MAC-enabled bus, the process proceeds to step S2010. If it is determined that the destination bus is not a MAC-enabled bus, the process proceeds to step S2008.

In step S2008, the transfer control unit 906 removes a part of the data field of the frame corresponding to the MAC. Next, the transfer control unit 906 subtracts the size of the MAC removed in step S2008 from the value of the DLC (step S2009), and the process proceeds to step S2014. It is to be noted that if a MAC is not added to the data field of the frame received by the gateway 90, the removal of the MAC and the subtraction of the size of the MAC from the DLC in steps S2008 and S2009, respectively, are not performed.

In step S2010, the transfer control unit 906 calculates a bus occupation rate of the destination bus and compares the calculated bus occupation rate with a condition indicated by the MAC removal condition list 9072 held by the transfer rule holding unit 907 to determine whether a MAC removal condition is satisfied. If a MAC removal condition is satisfied, the process proceeds to step S2008 to remove the MAC.

If determining in step S2010 that a MAC removal condition is not satisfied, the transfer control unit 906 checks whether a MAC is added to the frame received from the source bus (step S2011). If a MAC is not added, the transfer control unit 906 requests the MAC control unit 920 to generate a MAC to be included in a transmission frame to be transmitted to the destination bus, and the process proceeds to step S2012. If a MAC is added, the process proceeds to step S2014.

In step S2012, the MAC control unit 920 recalculates the size of the data field that will be increased as a result of the addition of a MAC and sets the value to the DLC. Next, the MAC control unit 920 calculates a MAC value for a value obtained by combining the message ID and the value of data transmitted from the transfer control unit 906 and the counter value in the counter list 9220 corresponding to the message ID using a MAC key in the MAC key list 9210 corresponding to the message ID and transmits the calculated MAC value to the transfer control unit 906 (step S2013). Upon receiving the MAC value, the transfer control unit 906 adds the MAC to the data field.

If, in step S2011, a MAC is added to the received frame, or after step S2009 or step S2013, the transfer control unit 906 transmits the message ID, the data field, the DLC, and destination bus information (destination bus ID) to the frame generation unit 905. As a result, the frame generation unit 905 generates a transmission frame by recalculating a CRC using the message ID and the data field transmitted from the transfer control unit 906 and transmits the destination bus information (destination bus ID) and the transmission frame to the frame communication unit 901 (step S2014).

Next, the frame communication unit 901 of the gateway 90 transmits the transmission frame generated by the frame generation unit 905 to a bus (i.e., the destination bus) indicated by the destination bus information (step S2015). As a result, the gateway 90 achieves the transfer of a frame between buses.

After step S2015, a destination ECU connected to the destination bus receives the frame transmitted (transferred) from the gateway 90 (step S2016). It is to be noted that when the destination ECU is a MAC-enabled ECU, a MAC might be removed from the content of the data field of the received frame in accordance with a bus occupation rate. The MAC-enabled ECU, however, can determine whether a MAC is added on the basis of a value of the DLC, for example, insofar as the size of data of a frame having a message ID to be processed thereby is predetermined in specifications or the like. In addition, in the vehicle network system 1 according to the present embodiment, information (e.g., a flag that uses a 1-bit area of the data field) indicating whether a MAC (verification information) is included in a frame may be included in the frame. If the gateway 90 removes a MAC, information indicating that a MAC is not included may be included in a frame. In this case, a MAC-enabled ECU that has received the frame in step S2015 can, on the basis of the information indicating whether a MAC is included, verify a MAC if a MAC is included or does not verify a MAC if a MAC is not included.

2.3 Advantageous Effects Produced by Second Embodiment

In the vehicle network system 1 according to the second embodiment, the amount of traffic of a destination bus can be suppressed since the gateway 90, when transferring a frame (message), transmits the frame while removing a MAC not only when a MAC-enabled ECU is not connected to the destination bus (i.e., the destination bus is a non-ECU-enabled bus), but also when, even if a MAC-enabled ECU is connected to a destination bus, a bus occupation rate of the destination bus is high enough to satisfy a MAC removal condition. In addition, if a bus occupation rate of a destination bus that is a MAC-enabled bus is too low to satisfy a MAC removal condition, the gateway 90 transfers a frame including a MAC. A MAC-enabled ECU connected to the destination bus, therefore, can determine whether the frame is unauthorized by verifying the MAC, and achieve securement of security of the vehicle network and the like.

Third Embodiment

Yet another embodiment as a modification of the vehicle network system 1 described in the first embodiment will be described hereinafter.

In the first embodiment, an example in which the same CAN standard format is used between buses as a format of data frames has been described (refer to FIG. 2). In a third embodiment, on the other hand, an example in which whether to use the CAN standard format or an enhanced format is determined for each bus will be described. The enhanced format is a format specified by a CAN with flexible data rate (CAN-FD), which is a derivative protocol of the CAN.

Components of a vehicle network system including a gateway device according to the present embodiment are the same as in the first embodiment, and the same reference numerals as in the first embodiment will be used herein. Differences from the first embodiment will be described hereinafter, and elements that are not described herein are the same as in the first embodiment.

3.1 Standard Format and Enhanced Format

FIG. 15A and FIG. 15B are diagrams illustrating a standard format and an enhanced format of data frames. FIG. 15A indicates the same CAN standard format as in FIG. 2, and FIG. 15B indicates the enhanced format, which is a format specified by the CAN-FD.

Whereas the ID (message ID) is 11 bits and the data field is 64 bits in the standard format, the ID (message ID) in the enhanced format is represented by 29 bits, which is the sum of 11 bits of a base ID in the ID field of the standard format and 18 bits of an enhanced ID, and the data field is enhanced to 512 bits.

3.2 Bus Information (Correspondence Format List)

A transfer rule holding unit 907 of the gateway 90 according to the present embodiment includes a correspondence format list 9073 as a kind of bus information, as well as the bus information 9070 and the transfer rule information 9071.

FIG. 16 illustrates an example of the correspondence format list as a kind of bus information held by the transfer rule holding unit 907 of the gateway 90 according to the present embodiment. Whereas the bus information 9070 (refer to FIG. 6) described in the first embodiment is information indicating, for each bus, whether the bus is a MAC-enabled bus or a non-MAC-enabled bus, the correspondence format list 9073 is information indicating, for each bus, whether a format of data frames communicated by the bus employs the standard format or the enhanced format. It is to be noted that the example illustrated in FIG. 16 is an example in which the reference numeral of each bus illustrated in FIG. 1 is an identifier (bus ID) of the bus.

In the example illustrated in FIG. 16, it is indicated that the bus 10, whose bus ID is 10, for example, can communicate frames of the enhanced format. In addition, it is indicated that the bus 50, whose bus ID is 50, can communicate frames of the standard format but cannot communicate frames of the enhanced format. It is to be noted that the content of the correspondence format list 9073 may be included in the bus information 9070.

In addition, for example, because the data field of the enhanced format is relatively large, the vehicle network system may be configured such that a bus to which a MAC-enabled ECU is connected corresponds to the enhanced format and a bus to which a MAC-enabled ECU is not connected but a non-MAC-enabled ECU is connected corresponds to the standard format. In this case, the gateway 90 may determine whether a destination bus is a MAC-enabled bus or a non-MAC-enabled bus on the basis of whether the destination bus is a bus corresponding to the standard format or the bus corresponding to the enhanced format using the correspondence format list 9073, not the bus information 9070. That is, if a destination bus is associated with a certain frame format in a correspondence format list (information in which each bus and a frame format are associated with each other), which is a kind of bus information, the gateway 90 can determine that a MAC removal condition is satisfied and then remove a MAC and transfer a frame.

Figure 17:
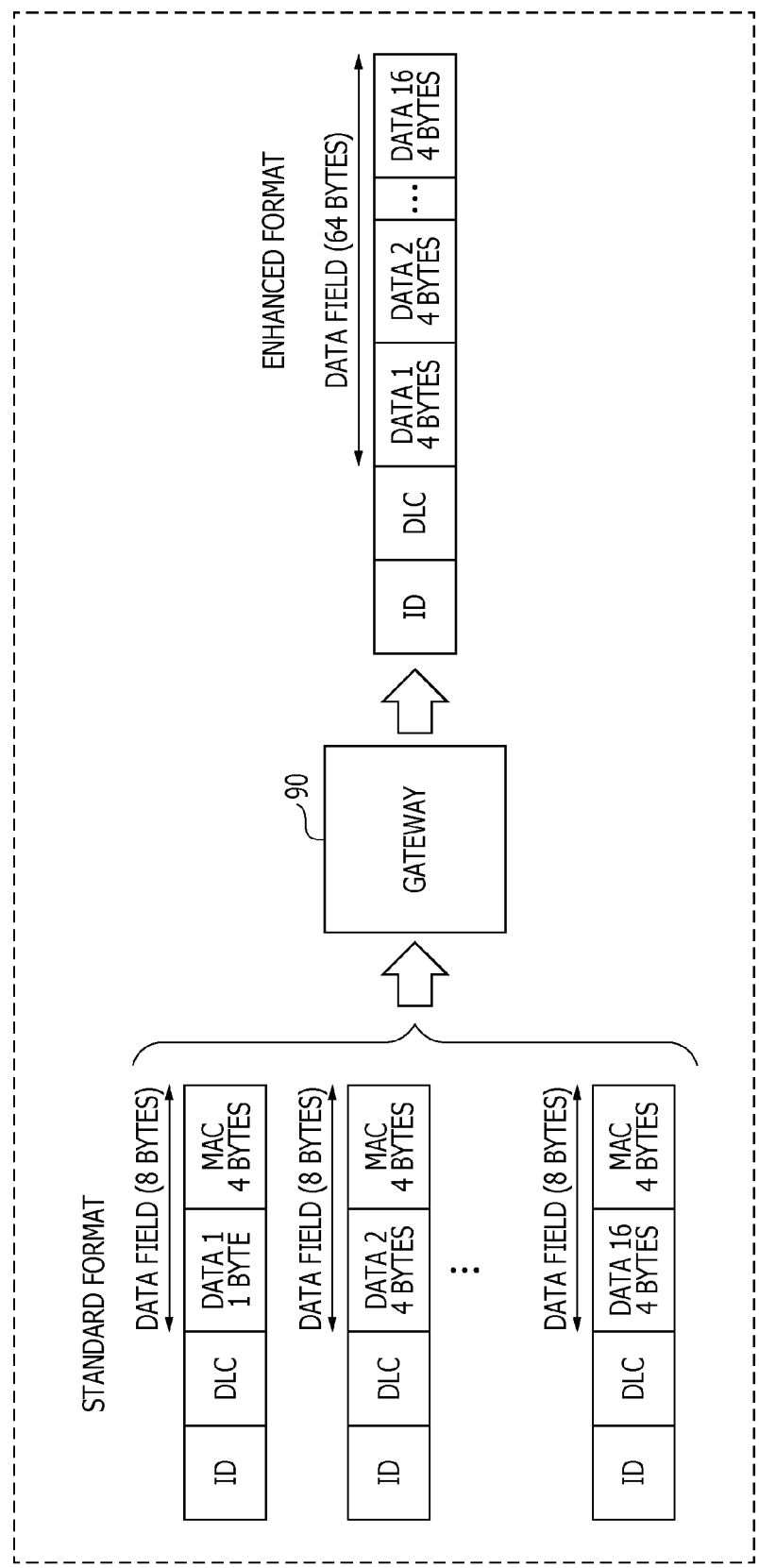
FIG. 17 is a diagram illustrating an example of format conversion performed by the gateway according to the third embodiment.

3.3 Example of Format Conversion Relating to Transfer of Frames from Standard Format Bus to Enhanced Format Bus FIG. 17 is a diagram illustrating an example of format conversion relating to transfer at a time when a frame source bus is a MAC-enabled bus corresponding to the standard format and a destination bus is a non-MAC-enabled bus corresponding to the enhanced format.

In the example illustrated in the figure, the transfer control unit 906 of the gateway 90 determines that the destination bus is a non-MAC-enabled bus, and then removes MACs in data fields of received frames, changes the format of the frames from the standard format to the enhanced format, and transfers the frames. In order to change the format to the enhanced format, the transfer control unit 906, as illustrated in FIG. 17, instructs the frame generation unit 905 to integrate the received frames of the standard format together as a single frame of the enhanced format and transfer the frame. Upon receiving the instruction, the frame generation unit 905 combines a plurality of pieces of data received from the transfer control unit 906 as a single piece of data to generate the frame of the enhanced format. The frame communication unit 901 then transmits the frame of the enhanced format generated by the frame generation unit 905 to the destination bus.

It is to be noted that the determination made by the gateway 90 as to whether to add or remove a MAC when transferring a frame is the same as in the first embodiment (refer to FIGS. 10 and 11). The determination may be made on the basis of a bus occupation rate of the destination bus, for example, as described in the second embodiment (refer to FIGS. 13 and 14).

When transferring a frame from a bus corresponding to the standard format to a bus corresponding to the enhanced format, the gateway 90 does not immediately transfer a received data frame of the standard format, for example, but, if one or more subsequent frames having the same message ID are received within a certain period of time, converts all the frames into the enhanced format and transmits (transfers) a resultant frame to a destination bus. If a subsequent frame having the same message ID is not received within the certain period of time, the gateway 90 converts only a data frame received before the certain period of time elapses into the enhanced format and transfers the frame. It is to be noted that the gateway 90 need not integrate frames together for transfer, but may, for example, transmit one frame of the enhanced format each time a frame of the standard format is received.

Figure 18:
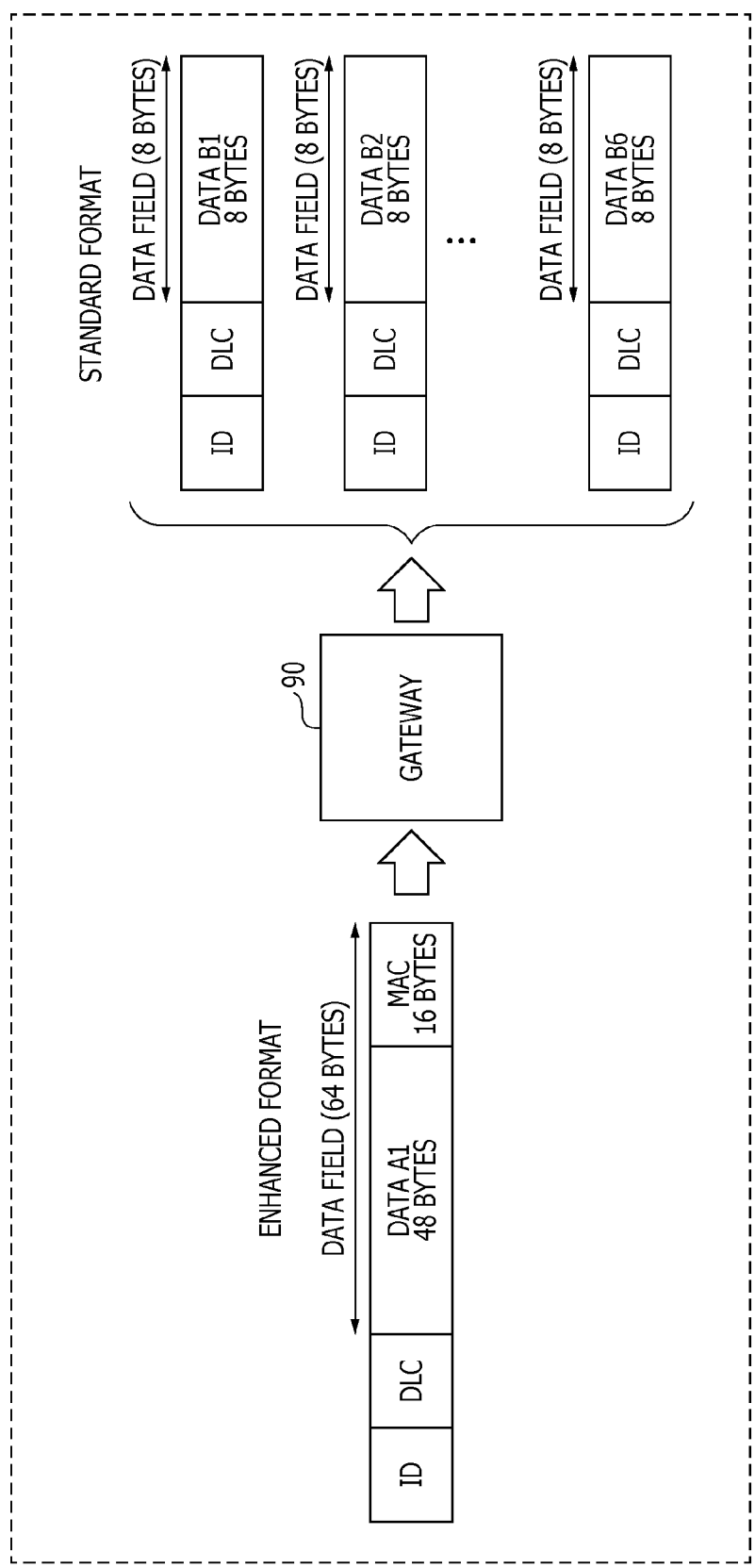
FIG. 18 is a diagram illustrating another example of the format conversion performed by the gateway according to the third embodiment.

3.4 Example of Format Conversion Relating to Transfer of Frame from Enhanced Format Bus to Standard Format Bus FIG. 18 is a diagram illustrating an example of format conversion relating to transfer at a time when a frame source bus is a MAC-enabled bus corresponding to the enhanced format and a destination bus is a non-MAC-enabled bus corresponding to the standard format.

In the example illustrated in the figure, the transfer control unit 906 of the gateway 90 determines that the destination bus is a non-MAC-enabled bus, and then removes a MAC from the data field of a received frame, changes the format from the enhanced format to the standard format, and transfers the frame. In order to change the format to the standard format, the transfer control unit 906, as illustrated in FIG. 18, instructs, on the basis of the length of the data field of the received data frame of the enhanced format, the frame generation unit 905 to transfer the frame as one frame of the standard format or, if the frame cannot be fully represented by the data field of the standard format, as a plurality of frames of the standard format. Upon receiving the instruction, the frame generation unit 905 divides data received from the transfer control unit 906 into a plurality of pieces of data to generate data frames of the standard format storing the pieces of data in the data fields. The frame communication unit 901 then transmits the frames of the standard format generated by the frame generation unit 905 to the destination bus. When a frame is divided and a plurality of frames are transmitted, the gateway 90 may, for example, successively transmit the frames or intermittently transmit the frames at predetermined transmission intervals.

3.5 Advantageous Effects Produced by Third Embodiment

In the vehicle network system 1 according to the third embodiment, the gateway 90 converts the format when transferring a frame (message) and, if a MAC-enabled ECU is not connected to a destination bus, for example, removes a MAC and transmits the frame. As a result, the amount of traffic of the destination bus can be suppressed.

Other Embodiments

The first to third embodiments have been described above as examples of the techniques relating to the present disclosure. The techniques relating to the present disclosure, however, are not limited to these, and may be applied to embodiments obtained by performing modification, replacement, addition, omission, or the like as necessary. The following modifications, for example, are included in an aspect of the present disclosure.

(1) Although an example in which whether to remove a MAC from a frame when transferring the frame is determined on the basis of whether a destination bus is a MAC-enabled bus, a bus occupation rate of a destination bus, a format of a frame to which a destination bus corresponds, or the like has been described in the above embodiments, the determination may be made on the basis of a combination of these or may be made using another condition as well, instead. In the first embodiment, if a destination bus is a MAC-enabled bus, the gateway transfers a frame without removing a MAC (while adding a MAC if a MAC is not added). In addition to a MAC-enabled ECU, a non-MAC-enabled ECU may also be connected to the MAC-enabled bus. In this case, the non-MAC-enabled ECU does not verify the MAC included in the frame, but the MAC-enabled ECU verifies the MAC. As a result, security can be secured.

(2) Although an example in which when transferring a frame including a MAC, the gateway 90 transfers (transmits) the frame to a destination bus without changing the content of the data field of the frame including the MAC if a bus occupation rate of the destination bus is lower than an occupation value predetermined as a MAC removal condition has been described in the second embodiment, the gateway 90 may transfer the frame while replacing the MAC, instead. As described in the first embodiment, if a MAC key is different for each bus, a method in which a MAC is replaced by one generated using a MAC key corresponding to a destination bus can be employed. An individual MAC key may be used for each ECU, or ECUs connected to the same bus may use the same MAC key. In addition, when transferring a frame that does not include a MAC, the gateway 90 may generate a frame to which a MAC has been added to the content of the data field of the frame and transfer (transmit) the frame to a destination bus if a bus occupation rate of the destination bus is lower than an occupation value predetermined as a MAC addition condition.

(3) Although an example in which the gateway 90 removes MACs from data frames of the CAN standard format and transmits the data frames as a single data frame of the CAN-FD enhanced format has been described in the third embodiment, the gateway 90 may add a MAC to the data frame of the enhanced format, instead, if an ECU connected to a destination bus is a MAC-enabled ECU. It is to be noted that a MAC to be included in the data frame of the enhanced format may be calculated on the basis of the MACs of the data frames of the standard format (e.g., by combining the MACs together), or the MAC may be calculated on the basis of data to be included in the data frame of the enhanced format, which is obtained by combining data in the data frames of the standard format together.

(4) Although an example in which, if a corresponding format is different between a source bus and a destination bus, the gateway 90 removes a MAC when transferring a frame has been described in the third embodiment, the gateway 90 may remove MACs from a plurality of frames, integrate the plurality of frames as a single frame of the standard format, and transfer the frame, instead, if a source bus and a destination bus correspond to the standard format. If data frames of the standard format each having a data field configured by 4-byte data and a 4-byte MAC is received, for example, the gateway 90 may integrate 4-byte pieces of data in the data fields of the two frames as a single 8-byte piece of data, store the data in the data field to generate a data frame of the standard format, and transfer the data frame. In addition, similarly, if a source bus and a destination bus correspond to the enhanced format, the gateway 90 may integrate the content of a plurality of frames from which MACs have been removed as a single frame of the enhanced format and transfer the frame.

(5) Although a single gateway 90 has been focused upon in the above embodiments, a vehicle network system may be configured such that the vehicle network system includes a plurality of gateway devices, and the plurality of gateway devices can be connected to a single bus, instead. Each gateway device can perform the same processes relating to transfer as those performed by the gateway 90 described in the above embodiments.

(6) Although a gateway 90 that determines, for each bus, whether the bus is a MAC-enabled bus and whether to remove or add a MAC when transferring a frame has been described in the above embodiments. A MAC is an example of frame verification information, and may be information used for another type of verification, instead. That is, the gateway 90 can make, for each bus, a determination relating to removal or addition of verification information on the basis of whether the bus is a verification-enabled bus (e.g., a MAC-enabled bus) to which an ECU having a function of verifying a frame on the basis of verification information (e.g., a MAC) is connected or a non-verification-enabled bus (e.g., a non-MAC-enabled bus) to which an ECU having the verification function is not connected. Alternatively, when transferring a frame, the gateway 90 may determine whether to remove a MAC or whether to add a MAC using information in which a message ID of the frame and whether an ECU that processes frames of the message ID is a MAC-enabled ECU or a non-MAC-enabled ECU are associated with each other in advance. As a specific example of this, the gateway 90 may hold, for each message ID, message identifier information for distinguishing a verification message identifier to be processed by a MAC-enabled ECU through verification or the like and a non-verification message identifier not to be processed through verification or the like and determine, in accordance with a message ID of a received frame, whether a MAC removal condition has been satisfied on the basis of the message identification information. If a message ID of a received frame is a non-verification message identifier, for example, the gateway 90 can determine that a MAC removal condition has been satisfied, and then remove a MAC and transfer the frame. It is to be noted that the message identifier information may be included in the bus information, and if a destination bus is a verification-enabled bus (e.g., a MAC-enabled bus) and an identifier of a received frame is a non-verification message identifier, the gateway 90 may determine that a MAC removal condition has been satisfied, and then remove a MAC and transfer the frame. In another specific example, the gateway 90 may hold, for each ECU, ECU information indicating whether the ECU is a MAC-enabled ECU (an ECU having a function of verifying a frame on the basis of a MAC) and determine whether a MAC removal condition has been satisfied on the basis of the ECU information. If an ECU that is connected to a destination bus, which is a destination of a received frame, and that performs a process according to the frame is not a MAC-enabled ECU, for example, the gateway 90 can determine that a MAC removal condition has been satisfied, and then remove a MAC and transfer the frame. It is to be noted that, when transferring a frame, the gateway 90 may hold information indicating which ECU is connected to which bus and use the information, or may hold information indicating which ECU processes a frame including each message ID and use the information. When transferring a frame, the gateway 90 can determine whether to remove a MAC from the frame on the basis of a bus occupation rate of a destination bus as necessary using, if needed, a list indicating, for each bus, whether the bus is MAC-enabled, a list indicating, for each ECU that can receive a frame, whether the ECU is a MAC-enabled ECU, a list indicating, for each message ID, whether the message ID can be processed by a MAC-enabled ECU, or the like.

(7) In the above embodiments, an example has been described in which the gateway 90 determines, when transferring a frame, whether to remove a MAC on the basis of whether each bus is a MAC-enabled bus (a bus to which a MAC-enabled ECU is connected). If both a MAC-enabled ECU and a non-MAC-enabled ECU are connected to a bus, however, the gateway 90 may achieve, after receiving a frame, transfer of the frame by transmitting a frame including a MAC, which is intended for the MAC-enabled ECU, and a frame from which a MAC has been removed, which is intended for the non-MAC-enabled ECU, and that includes a message ID different from the frame including a MAC. That is, the transfer units (the transfer control unit 906, the frame generation unit 905, the frame communication unit 901, and the like) of the gateway 90 may perform transfer of a frame by generating, for a received first frame including verification information (e.g., a MAC), a second frame that includes information based on the content of the first frame other than the verification information and that does not include the verification information and transmitting the second frame to a destination bus and transmit a third frame that includes information based on the content of the first frame other than the verification information, the verification information, and a frame identifier different from a frame identifier of the second frame. In this case, message IDs of the two types of frames transmitted from the gateway 90 are determined by the vehicle network system 1 in advance, and each ECU identifies a necessary message ID and receives a frame.

(8) Although the gateway 90 described in the above embodiments verifies, when transferring a frame, a MAC in step S1006 or the like, the gateway 90 may set, if MAC verification is successful, a value indicating that the MAC verification has been successful in a flag area preset in a part of the frame to be transferred, regardless of whether to remove a MAC. In this case, after receiving the frame in which the value indicating that the MAC verification has been successful is set in the flag area, an ECU connected to a destination bus may omit a process for verifying the MAC of the frame. As a result, for example, a processing load of the ECU can be reduced, and power can be saved. In addition, although an example in which, if verification of a MAC of a received frame fails, the gateway 90 stops transferring the frame has been described in the above embodiments, the gateway 90 may store a message ID of a frame if verification of a MAC of the frame fails, and need not transfer a frame even if a frame of the message ID is received thereafter, instead.

(9) Although removal of a MAC when a corresponding frame format is different between a source bus and a destination bus has been described in the third embodiment, a MAC may be added when a frame is transferred, instead. In addition, the gateway 90 may remove or add a MAC from or to a frame if a corresponding communication protocol type is different between a source and a destination bus (different in a physical layer or another higher layer), as well as if the frame format is different. Any gateway 90 may be used insofar as the gateway 90 has a function of transferring a frame received from a network to another network, and may be one that transfers a frame received from a network other than a bus (e.g., a wireless network) to a CAN bus. A difference between communication protocol types to which a network that has received a frame and a destination network correspond is, for example, a difference in a network type. As bus information, a communication protocol type used in communication performed by each bus may be associated for the bus. If the gateway 90 is connected to an Ethernet as well as a CAN bus, and if a source network is the Ethernet and a destination network is the CAN bus, for example, the gateway 90 may determine that a MAC removal condition has been satisfied, and remove a MAC. In addition, if a source network is the CAN bus and a destination network is the Ethernet, the gateway 90 may add a MAC. Network types (communication protocols) relating to a source network and a destination network that are used as a MAC removal or addition condition may be any network types, and may be, for example, a combination of a CAN, a CAN-FD, an Ethernet, a local interconnect network (LIN), a Flexray (registered trademark), and the like. In addition, when removal or addition of a MAC is predetermined for each network type, a method may be employed in which a MAC is added if a network having a frame length larger than a certain value is a destination, and a MAC is removed if a network having a frame length smaller than the certain value is a destination.

(10) If the content of a received data frame is encrypted, the gateway 90 described in the above embodiments may decrypt the frame, and then remove a MAC from the content of the decrypted frame or add a MAC to the content of the decrypted frame and transfer the frame. In this case, the content of the frame may be encrypted again. It is to be noted that if a destination ECU does not have a decryption function, for example, the gateway 90 may, when transferring a frame, change the content of the frame to plain text through decryption and transmit the frame. A load of a decryption process can be reduced in the ECU that has received the frame. In addition, if a destination ECU has a decryption function, a frame may be transmitted while the content of the frame is encrypted using a key corresponding to the ECU. At this time, if the frame is transferred while encrypting the content of the frame using common key cryptography, the content of the frame may be encrypted again using a key shared between the gateway 90 and the destination ECU.

(11) Although a MAC-enabled bus described in the above embodiments is a bus to which a MAC-enabled ECU is connected, a MAC-enabled bus may be, for example, a bus to which frames including a MAC are to be transmitted, instead. A non-MAC-enabled bus may be a bus to which frames that do not include a MAC are to be transmitted. By classifying each bus as a MAC-enabled bus or a non-MAC-enabled bus in the vehicle network system 1, an ECU suitable for each bus can be added to the bus as necessary.

(12) Although the gateway 90 described in the above embodiments has a function of removing a MAC under a certain condition and a function of adding a MAC under a certain condition when transferring a frame, the gateway 90 may have only one of the two functions, instead.

(13) Although each ECU (includes the gateway) described in the above embodiments is, for example, a device including digital circuits such as a processor and a memory, an analog circuit, and a communication circuit, the ECU may also include another hardware component such as a hard disk device, a display, a keyboard, or a mouse. In addition, instead of achieving a function in a software manner by executing a control program stored in the memory using the processor, the function may be achieved using dedicated hardware (a digital circuit, etc.).

(14) Some or all of the components of each of the above devices described in the above embodiments may be configured by a single system large-scale integration (LSI) circuit. A system LSI circuit is an ultra-multifunctional LSI circuit fabricated by integrating a plurality of components on a single chip and, more specifically, is a computer system configured by including a microprocessor, a ROM, a RAM, and the like. The RAM stores a computer program. When the microprocessor operates in accordance with the computer program, the system LSI circuit achieves a function thereof. In addition, each of the components of each of the above devices may be individually fabricated as a single chip, or some or all of the components may be fabricated as a single chip. Although a system LSI circuit is used here, an integrated circuit (IC), an LSI circuit, a super LSI circuit, or an ultra LSI circuit may be used, instead, depending on a degree of integration. A method for fabricating an integrated circuit is not limited to LSI, and an integrated circuit may be achieved using by a dedicated circuit or a general-purpose processor, instead. A field-programmable gate array (FPGA) capable of performing programming after an LSI circuit is fabricated or a reconfigurable processor capable of reconfiguring connections and settings of circuit cells inside the LSI circuit may be used. Furthermore, if a technique for fabricating an integrated circuit that replaces LSI appears as a result of evolution of semiconductor technologies or another derivative technology, function blocks may be obviously integrated using the technique. One of such possibilities is application of biotechnology.

(15) Some or all of the components of each of the above devices may be configured by an IC card or a separate module that can be removably attached to the device. The IC card or the module is a computer system configured by a microprocessor, a ROM, a RAM, and the like. The IC card or the module may include the above ultra-multifunctional LSI circuit. When the microprocessor operates in accordance with a computer program, the IC card or the module achieves a function thereof. The IC card or the module may be tamper-resistant.

(16) An aspect of the present disclosure may be a method such as a transfer method relating to transfer of a frame in the above-described vehicle network. For example, the transfer method includes reception step of receiving a frame and transfer step of transferring, after the frame is received in the reception step, the frame to a destination bus, which is one of buses, while removing or adding verification information (e.g., a MAC) used to verify the frame from or to the frame. An aspect of the present disclosure may be a computer program that achieves the method using a computer, or may be a digital signal including the computer program. In addition, an aspect of the present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray disc (BD; registered trademark), or a semiconductor memory. In addition, an aspect of the present disclosure may be the digital signal stored in one of these recording media. In addition, an aspect of the present disclosure may be the computer program or the digital signal transmitted through an electrical communication line, a wireless or wired communication line, a network typified by the Internet, datacasting, or the like. In addition, an aspect of the present disclosure may be a computer system including a microprocessor and a memory. The memory stores the computer program, and the microprocessor operates in accordance with the computer program. In addition, another independent computer system may implement an aspect of the present disclosure by storing and transporting the program or the digital signal in the recording medium or by transporting the program or the digital signal through the network or the like.

(17) The scope of the present disclosure also includes modes achieved by arbitrarily combining the components and the functions described in the above embodiments and the modifications.

The present disclosure can be used to appropriately transfer frames (messages) that can include verification information such as a MAC in a vehicle network used to communicate frames.

What is claimed is:

1. A gateway device connected to one or more networks used by a plurality of electronic controllers for communication, the gateway device comprising:
a processor and a memory configured to store instructions, which when executed by the processor, causes the gateway device to:
receive, via a receiver, a plurality of frames; and
remove verification information used to verify a frame of the plurality of frames from content of the frame received by the receiver and transfers the frame to a destination network, which is the one of one or more networks or that adds verification information to the content of the frame and transfers the frame to the destination network, wherein, if the frame of the plurality of frames is a first frame including verification information received by the receiver and satisfying a certain removal condition for removing the verification information, the gateway device performs the transfer by generating a second frame including information based on the content of the first frame other than the verification information and transmitting the second frame to the destination network,
hold transfer rule information indicating a criterion for selecting, from the one or more networks, the destination network to which the frame received by the receiver is to be transferred and network information indicating, for each network, whether the network is a verification-enabled network to which an electronic controller of the plurality of controllers having a function of verifying a frame of the plurality of frames on the basis of the verification information is connected or a non-verification-enabled network to which an electronic controller of the plurality of controllers having the verification function is not connected, wherein when transferring the frame, the gateway device selects the destination network on the basis of the transfer rule information and then, if the destination network is a non-verification-enabled network, determines that the certain removal condition has been satisfied and transfers the frame.

2. The gateway device according to claim 1,
wherein the network information includes message identifier information for distinguishing a verification message identifier, which is an identifier of a frame to be verified by an electronic controller of the plurality of controllers having the verification function connected to a verification-enabled network, and a non-verification message identifier, which is an identifier of a frame that is not to be verified, and
wherein, if the destination network is a verification-enabled network and an identifier of the frame received by the receiver is a non-verification message identifier, the gateway device determines that the certain removal condition has been satisfied and transfers the frame.

3. The gateway device according to claim 1,
wherein, if a network occupation rate of the destination network is higher than a certain value, the gateway device determines that the certain removal condition has been satisfied and transfers the second frame.

4. The gateway device according to claim 3,
further comprising including, in the second frame to be transmitted to the destination network, information indicating whether the second frame includes verification information.

5. The gateway device according to claim 1,
wherein the gateway device holds information indicating, for each electronic control unit of the plurality of controllers connected to the one or more networks, whether the electronic controller of the plurality of controllers has a function of verifying the frame of the plurality of frames on the basis of the verification information, and
wherein, if an electronic controller of the plurality of controllers that is connected to the destination network, to which the frame received by the receiver is to be transferred, and that performs a process according to the frame does not have the verification function, the gateway device determines that the certain removal condition has been satisfied and transfers the frame.

6. The gateway device according to claim 1,
wherein the gateway device holds message identifier information for distinguishing a verification message identifier, which is an identifier of a frame to be verified by an electronic controller of the plurality of controllers having a function of verifying a frame on the basis of the verification information connected to the one or more networks, and a non-verification message identifier, which is an identifier of a frame that is not to be verified, and
wherein, if an identifier of the frame received by the receiver is a non-verification message identifier, the gateway device determines that the certain removal condition has been satisfied and transfers the frame.

7. The gateway device according to claim 1,
wherein, if it is determined on the basis of verification based on the verification information of the frame received by the receiver that the frame is unauthorized, the gateway device does not transfer the frame.

8. The gateway device according to claim 1,
wherein the gateway device holds transfer rule information indicating a criterion for selecting, from the one or more networks, the destination network to which the frame received by the receiver is to be transferred and network information in which each network and a frame format are associated with each other, and
wherein, when transferring the frame, the gateway device selects the destination network on the basis of the transfer rule information and then, if the destination network is associated with a certain frame format in the network information, determines that the certain removal condition has been satisfied and transfers the frame.

9. The gateway device according to claim 1,
wherein the gateway device holds transfer rule information indicating a criterion for selecting, from the one or more networks, the destination network to which the frame received by the receiver is to be transferred and the network information in which each network and a type of communication protocol used for communication performed by the network are associated with each other, and
wherein, when transferring the frame, the gateway device selects the destination network on the basis of the transfer rule information and then, if the destination network is associated with a certain communication protocol in the network information, determines that the certain removal condition has been satisfied and transfers the frame.

10. The gateway device according to claim 1,
wherein, if the first frame including verification information received by the receiver does not satisfy the certain removal condition for removing the verification information, the gateway device generates the second frame including the information based on the content of the first frame other than the verification information and verification information generated using a key shared with an electronic controller of the plurality of controllers connected to the destination network and transmits the second frame to the destination network.

11. The gateway device according to claim 1,
wherein, the gateway device performs the transfer by generating a generated frame including information based on content of the frame and verification information, and by transmitting the generated frame to the destination network, when a frame that has been received by the receiver and that does not include verification information satisfies a certain additional condition for adding the verification information.

12. The gateway device according to claim 1,
wherein, if the content of the frame received the receiver is encrypted, the gateway device removes, after decrypting the frame, verification information from the content of the decrypted frame or adds verification information to the content of the decrypted frame and transfers the frame.

13. The gateway device according to claim 1,
wherein the gateway device performs the transfer by generating a second frame that includes information based on the content of the first frame including verification information received by the receiver other than the verification information but that does not include verification information and transmitting the second frame to the destination network and transmits a third frame that includes the information based on the content of the first frame other than the verification information, verification information, and a frame identifier different from a frame identifier of the second frame.

14. A vehicle network system comprising:
a plurality of electronic controllers that communicate with one another through one or more networks; and
a gateway connected to the one or more networks, wherein the gateway includes a receiver that receives a frame and a processor and a memory configured to store instructions, which when executed by the processor, causes the gateway to remove verification information used to verify the frame from content of the frame received by the receiver and transfers the frame to a destination network, which is the one of one or more networks or that adds verification information to the content of the frame and transfers the frame to the destination network, wherein, if the frame of the plurality of frames is a first frame including verification information received by the receiver and satisfying a certain removal condition for removing the verification information, the gateway performs the transfer by generating a second frame including information based on the content of the first frame other than the verification information and transmitting the second frame to the destination network,
wherein when the instructions are executed by the processor, the processor further causes the gateway to transfer rule information indicating a criterion for selecting, from the one or more networks, the destination network to which the frame received by the receiver is to be transferred and network information indicating, for each network, whether the network is a verification-enabled network to which an electronic controller of the plurality of electronic controllers having a function of verifying a frame on the basis of the verification information is connected or a non-verification-enabled network to which an electronic controller of the plurality of electronic controllers having the verification function is not connected, and
wherein, when transferring the frame, the gateway selects the destination network on the basis of the transfer rule information and then, if the destination network is a non-verification-enabled network, determines that the certain removal condition has been satisfied and transfers the frame.

15. The vehicle network system according to claim 14, further comprising:
wherein, when transferring the frame received by the receiver, the gateway selects the destination network on the basis of the transfer rule information and then, on the basis of whether the destination network is a network to which the electronic controller of the plurality of electronic controllers having a function of verifying a frame on the basis of verification information, removes or adds verification information from or to the frame and transfers the frame.

16. A transfer method used in a vehicle network system including one or more electronic control units that communicate with one another through one or more networks, the transfer method comprising:
receiving a frame;
transferring, after the frame is received in the receiving, the frame to a destination network, which is one of the one or more networks, while removing or adding verification information used to verify the frame from or to the frame, wherein, when a frame that has been received and that does not include verification information and satisfying a certain additional condition for adding the verification information; and
indicating, using holding transfer rule information, a criterion for selecting, from the one or more networks, the destination network to which the received frame is to be transferred and network information indicating, for each network, whether the network is a verification-enabled network to which a first electronic controller having a function of verifying the frame on the basis of the verification information is connected, or whether the network is a non-verification-enabled network to which a second electronic controller having the verification function is not connected,
wherein the transferring comprises:
generating a generated frame including information based on content of the frame and verification information, and
transmitting the generated frame to the destination network.

* * * * *